United States Patent
Hariton

(10) Patent No.: US 11,983,830 B2
(45) Date of Patent: *May 14, 2024

(54) SYSTEMS AND METHODS FOR GENERATING AND FACILITATING ACCESS TO A PERSONALIZED AUGMENTED RENDERING OF A USER

(71) Applicant: Nicholas T. Hariton, Trabuco Canyon, CA (US)

(72) Inventor: Nicholas T. Hariton, Trabuco Canyon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,762

(22) Filed: Nov. 28, 2022

(65) Prior Publication Data

US 2023/0093062 A1 Mar. 23, 2023

Related U.S. Application Data

(63) Continuation of application No. 16/951,319, filed on Nov. 18, 2020, now Pat. No. 11,532,134, which is a
(Continued)

(51) Int. Cl.
*G06T 19/20* (2011.01)
*G06T 19/00* (2011.01)
(Continued)

(52) U.S. Cl.
CPC .......... *G06T 19/006* (2013.01); *G06T 19/20* (2013.01); *H04L 67/131* (2022.05);
(Continued)

(58) Field of Classification Search
CPC ............... G06T 19/006; G06T 19/20; G06T 2219/2021; H04L 67/131; G06F 21/10; G06F 2221/0708
(Continued)

(56) References Cited

U.S. PATENT DOCUMENTS

| 2,015,027 | A | 9/1935 | Finley |
| 6,335,731 | B1* | 1/2002 | Yamamoto ............ A63F 13/837 382/285 |

(Continued)

FOREIGN PATENT DOCUMENTS

| WO | 2014147686 | 9/2014 |
| WO | 2018055459 | 3/2018 |

OTHER PUBLICATIONS

Broll, Wolfgang. "Populating the Internet: supporting multiple users and shared applications with VRML." Proceedings of the second symposium on Virtual reality modeling language. 1997. (Year: 1997) 8 pages.

(Continued)

*Primary Examiner* — Jin Ge
(74) *Attorney, Agent, or Firm* — Esplin & Associates, PC

(57) ABSTRACT

Systems and methods for generating and facilitating access to a personalized augmented rendering of a user to be presented in an augmented reality environment are discussed herein. The augmented rendering of a user may be personalized by the user to comprise a desired representation of the user in an augmented reality environment. When a second user is detected within the field of view of a first user, the second user may be identified and virtual content (e.g., an augmented rendering) for the second user may be obtained. The virtual content obtained may differ based on one or more subscriptions of the first user and/or permissions associated with the virtual content of the second user. The virtual content obtained may be rendered and appear superimposed over or in conjunction with a view of the second in the augmented reality environment.

15 Claims, 7 Drawing Sheets

Related U.S. Application Data continuation of application No. 16/782,752, filed on Feb. 5, 2020, now Pat. No. 10,861,245, which is a continuation of application No. 16/265,812, filed on Feb. 1, 2019, now Pat. No. 10,593,121, which is a continuation of application No. 15/965,689, filed on Apr. 27, 2018, now Pat. No. 10,198,871.

(51) Int. Cl.
*H04L 67/131* (2022.01)
*G06F 21/10* (2013.01)

(52) U.S. Cl.
CPC .. *G06F 21/1013* (2023.08); *G06F 2221/2137* (2013.01); *G06T 2219/2021* (2013.01)

(58) Field of Classification Search
USPC ......................................................... 345/633
See application file for complete search history.

(56) References Cited

U.S. PATENT DOCUMENTS

| | | | |
|---|---|---|---|
| 7,274,380 B2 | 9/2007 | Navab | |
| 7,373,377 B2 | 5/2008 | Altieri | |
| 7,774,027 B2 | 8/2010 | Parikh | |
| 8,139,067 B2 | 3/2012 | Anguelov | |
| 8,228,325 B2 | 7/2012 | Barbaro Altieri | |
| 8,275,590 B2 | 9/2012 | Szymczyk | |
| 8,451,266 B2 | 5/2013 | Hertenstein | |
| 8,458,028 B2 | 6/2013 | Altieri | |
| 8,462,198 B2 | 6/2013 | Lin | |
| 8,473,835 B2 | 6/2013 | Hariton | |
| 8,490,007 B1 | 7/2013 | Hoffman | |
| 8,847,953 B1 | 9/2014 | Cho | |
| 9,001,118 B2 | 4/2015 | Molyneaux | |
| 9,041,622 B2 | 5/2015 | McCulloch | |
| 9,230,367 B2 | 1/2016 | Stroila | |
| 9,251,626 B2 | 2/2016 | Wang | |
| 9,317,670 B2 | 4/2016 | Gudlavenkatasiva | |
| 9,323,325 B2 | 4/2016 | Perez | |
| 9,324,318 B1 | 4/2016 | Bunn | |
| 9,345,957 B2 | 5/2016 | Geisner | |
| 9,354,702 B2 | 5/2016 | Mullins | |
| 9,374,788 B2 | 6/2016 | Singamsetti | |
| 9,400,593 B2 | 7/2016 | Hariton | |
| 9,709,983 B2 | 7/2017 | Seydoux | |
| 9,792,584 B2 | 10/2017 | Hariton | |
| 10,102,659 B1 | 10/2018 | Hariton | |
| 10,105,601 B1 | 10/2018 | Hariton | |
| 10,198,871 B1 | 2/2019 | Hariton | |
| 10,565,767 B2 | 2/2020 | Hariton | |
| 10,586,396 B1 | 3/2020 | Hariton | |
| 10,593,121 B2 | 3/2020 | Hariton | |
| 10,636,188 B2 | 4/2020 | Hariton | |
| 10,661,170 B2 | 5/2020 | Hariton | |
| 10,672,170 B1 | 6/2020 | Hariton | |
| 10,679,427 B1 | 6/2020 | Hariton | |
| 10,796,467 B2 | 10/2020 | Hariton | |
| 10,818,096 B1 | 10/2020 | Hariton | |
| 10,839,409 B1 | 11/2020 | Aquilla | |
| 10,846,931 B1 | 11/2020 | Hariton | |
| 10,861,245 B2 | 12/2020 | Hariton | |
| 10,867,424 B2 | 12/2020 | Hariton | |
| 11,107,282 B1 | 8/2021 | Boissière | |
| 11,120,596 B2 | 9/2021 | Hariton | |
| 11,145,136 B2 | 10/2021 | Hariton | |
| 11,185,775 B2 | 11/2021 | Hariton | |
| 11,198,064 B2 | 12/2021 | Hariton | |
| 11,200,748 B2 | 12/2021 | Hariton | |
| 11,249,714 B2 | 2/2022 | Spivack | |
| 11,487,353 B2 | 11/2022 | Harvey | |
| 2004/0162638 A1 | 8/2004 | Solomon | |
| 2008/0284777 A1 | 11/2008 | Altieri | |
| 2009/0288150 A1 | 11/2009 | Toomim | |
| 2011/0018903 A1 | 1/2011 | Lapstun | |
| 2011/0292076 A1 | 12/2011 | Wither | |
| 2012/0001938 A1 | 1/2012 | Sandberg | |
| 2012/0075430 A1 | 3/2012 | Ito | |
| 2012/0077584 A1 | 3/2012 | Sarmenta | |
| 2012/0113223 A1 | 5/2012 | Hilliges | |
| 2012/0122570 A1 | 5/2012 | Baronoff | |
| 2012/0209714 A1 | 8/2012 | Douglas | |
| 2012/0218263 A1 | 8/2012 | Meier | |
| 2013/0083173 A1 | 4/2013 | Geisner | |
| 2013/0201215 A1 | 8/2013 | Martellaro | |
| 2013/0278635 A1 | 10/2013 | Maggiore | |
| 2013/0326364 A1 | 12/2013 | Latta | |
| 2013/0342572 A1 | 12/2013 | Poulos | |
| 2014/0007247 A1 | 1/2014 | Carter | |
| 2014/0035901 A1 | 2/2014 | Jiawen | |
| 2014/0091984 A1 | 4/2014 | Ashbrook | |
| 2014/0122737 A1 | 5/2014 | Silberstein | |
| 2014/0248950 A1 | 9/2014 | Tosas Bautista | |
| 2014/0368537 A1 | 12/2014 | Salter | |
| 2015/0050994 A1 | 2/2015 | Mangold | |
| 2015/0235423 A1 | 8/2015 | Tobita | |
| 2015/0274294 A1 | 10/2015 | Dahlstrom | |
| 2015/0346722 A1 | 12/2015 | Herz | |
| 2015/0356781 A1 | 12/2015 | Miller | |
| 2015/0371447 A1 | 12/2015 | Yasutake | |
| 2016/0026253 A1 | 1/2016 | Bradski | |
| 2016/0110922 A1 | 4/2016 | Haring | |
| 2016/0179455 A1 | 6/2016 | Liu | |
| 2016/0187654 A1 | 6/2016 | Border | |
| 2016/0203586 A1 | 7/2016 | Chang | |
| 2016/0210780 A1 | 7/2016 | Paulovich | |
| 2016/0314716 A1 | 10/2016 | Grubbs | |
| 2017/0024932 A1* | 1/2017 | Sugaya | G02B 27/0093 |
| 2017/0038829 A1* | 2/2017 | Lanier | G06T 19/006 |
| 2017/0092002 A1 | 3/2017 | Mullins | |
| 2017/0132842 A1* | 5/2017 | Morrison | G06F 3/04815 |
| 2017/0277264 A1 | 9/2017 | Grant | |
| 2017/0337858 A1 | 11/2017 | Vartanian | |
| 2017/0339372 A1 | 11/2017 | Valli | |
| 2017/0354875 A1 | 12/2017 | Marks | |
| 2018/0018825 A1 | 1/2018 | Kim | |
| 2018/0096507 A1 | 4/2018 | Valdivia | |
| 2018/0123813 A1 | 5/2018 | Milevski | |
| 2018/0126620 A1 | 5/2018 | Talgorn | |
| 2018/0201370 A1 | 7/2018 | Yang | |
| 2018/0341386 A1* | 11/2018 | Inomata | A63F 13/211 |
| 2018/0373413 A1 | 12/2018 | Sawaki | |
| 2019/0023418 A1 | 1/2019 | Ro | |
| 2019/0087995 A1 | 3/2019 | Hariton | |
| 2019/0126149 A1 | 5/2019 | Hariton | |
| 2019/0217202 A1 | 7/2019 | Komori | |
| 2019/0244404 A1 | 8/2019 | Goslin | |
| 2019/0248485 A1 | 8/2019 | Ulaganathan | |
| 2019/0251720 A1 | 8/2019 | Hariton | |
| 2019/0324539 A1 | 10/2019 | Wu | |
| 2019/0329136 A1 | 10/2019 | Koyama | |
| 2019/0333277 A1 | 10/2019 | Hariton | |
| 2019/0391724 A1 | 12/2019 | Holz | |
| 2020/0092287 A1 | 3/2020 | Cano | |
| 2020/0097246 A1 | 3/2020 | McCoy | |
| 2020/0110560 A1 | 4/2020 | Hariton | |
| 2020/0151930 A1 | 5/2020 | Hariton | |
| 2020/0175772 A1 | 6/2020 | Hariton | |
| 2020/0222805 A1 | 7/2020 | Hariton | |
| 2020/0226809 A1 | 7/2020 | Hariton | |
| 2020/0226810 A1 | 7/2020 | Hariton | |
| 2020/0246699 A1 | 8/2020 | Hariton | |
| 2020/0349767 A1 | 11/2020 | Hariton | |
| 2020/0349771 A1 | 11/2020 | Hariton | |
| 2021/0019927 A1 | 1/2021 | Hariton | |
| 2021/0019950 A1 | 1/2021 | Hariton | |
| 2021/0035372 A1 | 2/2021 | Hariton | |
| 2021/0090340 A1 | 3/2021 | Hariton | |
| 2021/0104084 A1 | 4/2021 | Hariton | |
| 2021/0220737 A1 | 7/2021 | Fish | |
| 2021/0407208 A1 | 12/2021 | Hariton | |
| 2022/0051461 A1 | 2/2022 | Hariton | |
| 2022/0080311 A1 | 3/2022 | Hariton | |

(56) References Cited

U.S. PATENT DOCUMENTS

2022/0096929 A1 3/2022 Hariton
2022/0101616 A1 3/2022 Hariton
2023/0364512 A1 11/2023 Hariton
2023/0368433 A1 11/2023 Hariton

OTHER PUBLICATIONS

Caroly Giardina, New Venture Aims to Creat AI-Driven Digital "Copies" of Hollywood Stars; published Jun. 28, 2017; [retrieved Sep. 18, 2017] retrieved from the Internet http://www.hollywoodreporter.com/behind-screen/new-venture-aims-create-ai-driven-digital-copies-hollywood-stars-1017298 (2 pages).
David Kariuki, 7 firms with face tracking tech for better VR avatars, Hypergrid Business; Nov. 20, 2016, retrieved from the internet http://www.hypergridbusiness.com/2016/11/ai-emotion-and-facial-tracking-to-help-make-vr-avatars-more-realistic/ (16 pages).
E. Matchar, "When Work Becomes a Game," published Feb. 16, 2016, downloaded from https://www.smithsonianmag.com/innovation/when-work-becomes-game-180958145/ (Year: 2016) 6 pages.
Josh Constine, Augmented Reality for Trying on Makeup Is a Booming Business Posted Jan. 19, 2016 by Josh Constine (@joshconstine)—TechCrunch, retrieved from the Internet https://techcrunch.com/2016/01/19/facial-precognition/ (9 pages).
Kato, et al., Marker Tracking and HMD Calibration for a Video-based Augmented Reality Conferencing System, in Proceedings of the 2nd International Workshop on Augmented Reality (IWAR 99). Oct. 1999, [retrieved Dec. 7, 2009] retrieved from the Internet <http://www.hitl.washington.edu/artoolkit/Papers/IWAR99.kato.pdf> (10 pages).
Mashalkar, et al., Personalized Animatable Avatars from Depth Data, Joint Virtual Reality Conference of EGVE—EuroVR (2013), [retrieved Sep. 18, 2017] retrieved from the internet https://www.cse.iitb.ac.in/~paragc/pubs/papers/paper_jvrc2013.pdf (8 pages).
Mindshow promotional video, Mindshow Official Trailer—Create Animated Movies in Virtual Reality, YouTube, Published Apr. 14, 2017 [retrieved Sep. 18, 2017] retrieved from the Internet https://www.youtube.com/watch?v=UCVwx_vNe8U, and https://www.youtube.com/watch?v=2p9Cx4iX47E (4 pages).

Mindshow Webpage, About | Mindshow, [retrieved Sep. 18, 2017] retrieved from the Internet https://mindshow.com/about/ (6 pages).
Mindshow Webpage, How it Works, [retrieved Sep. 18, 2017] retrieved from the Internet https://mindshow.com/#how-t-works (4 pages).
Neal Stephenson, Snow Crash; New York : Del Rey, 1992, (pp. 44-50, 66, 70, 76, 79, 562, and 563).
R. Schuler, "How Does the Internet work," published 2002, downloaded from https://web.stanford.edu/class/msande91si/www-spr04/readings/week1/InternetWhitepaper.htm (Year: 2002); 5 pages.
Rekimoto, et al., CyberCode: Designing Augmented Reality Environments with Visual Tags, Interaction Laboratory, Sony Computer Science Laboratories, Inc. Mar. 14, 2013, retrieved from the Internet http://citeseerx.ist.psu.edu/viewdoc/download?doi=10.1.1.37.126&rep=rep1&type=pdf (10 pages).
Roma: Interactive Fabrication with Augmented Reality and a Robotic Printer, YouTube video, published Feb. 11, 2018, downloaded from https://www.youtube.com/watch?time_continue=148&v=K_wWuYD1Fkg&feature=emb_logo (Year: 2018) 1 page.
T. Klosowski, The Psychology of Gamification: Can Apps Keep You Motivated?, Lifehacker website, published Feb. 13, 2014, 16 pages, downloaded at https://lifehacker.com/the-psychology-of-gamification-can-apps-keep-you-motiv-1521754385 (Year: 2014).
Woodrow Barfield, Fundamentals of Wearable Computers and Augmented Reality, Second Edition (p. ix). CRC Press. Kindle Edition. Chapel Hill, North Carolina, Jul. 29, 2015, (pp. 59, 60, 195, 196, 227).
YouTube video, "Drone Grafitti 2013-2016," published Jul. 31, 2016, downloaded from https://www.youtube.com/watch?v=Ep5tPWphKFY (Year: 2016).
Techopedia website, "Machine Code," published Jun. 16, 2017, downloaded from https://www.techopedia.com/definition/8179/machine-code-mc (Year: 2017).
A. Oppermann, "What is Nanorobotics?", builtin.com website, dated Mar. 3, 2023, downloaded from https://builtin.com/robotics/nanorobotics (Year: 2023).
R. Walters, "Real life Construction quadcopter robots being developed," Extremetech website, dated Dec. 2, 2011, downloaded from https://www.extremetech.com/extreme/107217-real-life-constructicon-quadcopter-robots-being-developed(Year: 2011).

\* cited by examiner

SYSTEMS AND METHODS FOR GENERATING AND FACILITATING ACCESS TO A PERSONALIZED AUGMENTED RENDERING OF A USER

FIELD OF THE INVENTION

The systems and methods described herein relate to presenting virtual content in an augmented reality environment.

BACKGROUND

Augmented reality environments may be used to present virtual content to users as if it were present in the real world.

SUMMARY

The systems and methods described herein may generate and facilitate access to a personalized augmented rendering of a user to be presented in an augmented reality environment. An augmented reality environment may include views of images forming virtual content superimposed over views of the real world. The virtual content may comprise an augmented rendering of a user or other living entity that is depicted in the augmented reality environment based on the user or other living entity. The augmented rendering of a user may be personalized by the user to comprise one or more desired representations of the user that may be depicted in an augmented reality environment. When a second user is detected within the field of view of a first user, the second user may be identified. The system may access subscription information for the first user and/or permission information of the virtual content of the second user to determine whether the first user may access the virtual content of the second user. Based on the identification of the second user and a determination that the first user may access at least a portion of the virtual content of the second user, virtual content information defining virtual content (e.g., an augmented rendering) of the second user may be obtained. Based on the subscription information and permission information, the virtual content that is presented to the first user may differ. Using the virtual content information and one or more identified linkage points of the second user within the field of view of the first user, the virtual content may be rendered and appear superimposed over or in conjunction with a view of the second in the augmented reality environment.

In various implementations, the system described herein may be configured to generate and facilitate access to virtual content to be presented in an augmented reality environment, in accordance with one or more implementations. The system may include one or more of an interface, one or more physical processors, electronic storage, a display device, an imaging sensor, and/or other components.

The one or more physical processors may be configured by computer-readable instructions. Executing the computer-readable instructions may cause the one or more physical processors to generate and facilitate access to virtual content to be presented in an augmented reality environment. The computer-readable instructions may include one or more computer program components. The computer program components may include one or more of a content generation component, a content management component, an image generation component, a display control component, and/or other computer program components. The one or more physical processors may be physically located within a user device and/or within any of the other components of the system. For example, the user device may comprise the display device and/or be communicatively coupled to the display device. The one or more physical processors may represent processing functionality of multiple components of the system operating in coordination. Therefore, the various processing functionality described in relation to the one or more processors may be performed by a single component or by multiple components of the system.

The content generation component may be configured to generate and modify virtual content to be displayed in an augmented reality environment, such as an augmented rendering of a user. An augmented rendering of a user or other living entity may comprise a full- or partial-body virtual content item depicted based on that user or living entity. In various implementations, the content generation component may be configured to obtain one or more images of a user and generate a three-dimensional representation of the user based on the one or more images. The three-dimensional representation may be modified and stored in order to later serve as the augmented rendering of the user.

In some implementations, the content generation component may be configured to generate an augmented rendering of a user based on a predefined three-dimensional representation. For example, a predefined three-dimensional representation may comprise a known individual or celebrity (such as a professional athlete, famous actor, musician, or other real-life individual dead or alive), a fictional character (such as a movie character, a cartoon character, a character from a video game, and/or other fictional character), a stock character generated for display in an augmented reality environment, and/or other predefined three-dimensional representation. Predefined three-dimensional representations may be downloaded and/or otherwise obtained from an online marketplace or catalog.

In various implementations, a three-dimensional representation of a user may be modified by the user to generate a personalized augmented rendering for the user in an augmented reality environment. For example, a user may modify a three-dimensional representation of a user via user input indicating a request to modify one or more parameters that define the appearance, movements, animation, tactile feedback, and/or other aspects of the augmented rendering. For example, a user may modify one or more parameters related to height, weight, hair, muscle tone, skin tone, body proportions, to simulate plastic surgery, to address one or more undesirable features, to enhance one or more desirable features, and/or other aspects of a three-dimensional representation.

In some implementations, the content generation component may be configured to programmatically modify a three-dimensional representation of a user based on predefined options. For example, a predefined option may relate to body type, age (or age range), one or more desirable features, one or more undesirable features, addition, removal, and/or replacement of one or more body parts, and/or one or more other predefined options related to a three-dimensional representation. In some implementations, the content generation component may be configured to programmatically implement symmetrical changes made to a three-dimensional representation.

The content management component may be configured to manage and facilitate access to virtual content information defining virtual content to be rendered in an augmented reality environment. In various implementations, the content management component may be configured to obtain virtual content information defining virtual content and transmit, provide, or otherwise make available the virtual content information.

In various implementations, the content management component may be configured to detect and identify a user or other living entity visible within the field of view of a user. As discussed herein, a user visualizing an augmented reality environment via a display device may comprise "a viewing user," and a user or living entity seen within the augmented reality environment visualized by the viewing user may comprise "a viewed user." For example, a user or other living entity (i.e., a viewed user) may be identified using facial recognition or body recognition, by recognizing a transponder associated with one or more specific users, by recognizing a user device associated with one or more specific users, based on audio information associated with one or more specific users, by recognizing one or more specific users within the field of view of the user associated with one or more specific users, and/or using one or more other recognition techniques.

In various implementations, the content management component may be configured to obtain virtual content information defining virtual content related to a viewed user identified within a field of view of a viewing user. Each user, specific living entity, type of living entity, and/or group of living entities may be associated with specific virtual content. The virtual content information obtained may define the virtual content item to be displayed when the identified viewed user is present within the field of view of the viewing user. Based on the virtual content information obtained, the content management component may be configured to provide instructions to the image generation component to generate an image of the virtual content to be displayed in an augmented reality environment based on the virtual content information.

In various implementations, the content management component may be configured to determine the content a viewing user has access to based on subscription information for the user and/or permission information associated with virtual content. Different subscriptions may enable a user to access different content. For example, each subscription may provide access to a different level of content and/or virtual content of one or more specific users or groups of users. In some implementations, a user may select which users may access their virtual content (e.g., their augmented rendering). As such, two different users may concurrently visualize different virtual content associated with a third user. For example, a user may indicate that different subscription levels may access different aspects of one or more of their augmented renderings and/or different augmented renderings altogether. For example, a user may select to provide access to the entirety of their augmented rendering only to their closest friends, and provide only limited access to their augmented rendering to family and co-workers. A user's selections regarding access to their virtual content may be reflected in permission information and/or subscription information for the virtual content.

In various implementations, the content management component may be configured to determine whether a first user is a subscriber, or otherwise has access, to virtual content of a second user identified within a field of view of the first user. For example, the content management component may access subscription information for the first user that indicates one or more subscriptions of the first user. Based on a determination that a first user is a subscriber, or otherwise has access, to virtual content of a second user, the content management component may be configured to obtain virtual content information defining virtual content related to the second user. In some implementations, the first user may be able to determine which virtual content of a second user to which they have access. For example, a first user may request access to virtual content of different users, purchase additional access (e.g., by purchasing additional subscription(s) and/or pay for access to virtual content of a particular user) and/or select from available content (content accessible by the first user) to display in the augmented reality environment viewed by the first user.

In some implementations, the content management component may be configured to facilitate access to virtual content by one or more third parties. One or more third parties may provide services enabling users to utilize virtual content outside an augmented reality environment. For example, the content management component may be configured to facilitate access to a third party manufacturer to generate an action figure or other physical representation of virtual content generated by the content generation component. In some implementations, the content management component may be configured to facilitate access to virtual content information to enable use of the virtual content in one or more interactive games. For example, the content management component may be configured to facilitate access to virtual content information by a third party application related to an interactive game, thereby permitting the third party application to utilize the augmented rendering of the user in the interactive game. When used in the interactive game, the augmented rendering of the user may be utilized as, or incorporated into, an avatar of the user. An avatar of a user may comprise an icon or figure representing a particular person when the person is not physically present, such as when a user is remote or for use in an interactive game.

The image generation component may be configured to generate an image of virtual content to be displayed in an augmented reality environment. In various implementations, the image generation component may be configured to generate an image of virtual content to be displayed in an augmented reality environment based at least on a user's field of view and virtual content information (i.e., information defining at least the virtual content and a reference frame of the virtual content).

A user's field of view may be defined based on orientation information, location information, and/or other information. The orientation information may define an orientation of the display device. For example, the orientation of display device may be defined by one or more of a pitch angle, a roll angle, a yaw angle, and/or other measurements. When looking through the display device, the orientation of display device may indicate the direction of a user's gaze. The location information may identify a physical location of the display device. By determining the direction of a user's gaze and the user's physical position in the real world, a user's field of view may be determined.

The image generation component may be configured to automatically generate images of the virtual content as a user's field of view changes or as a living entity moves within a user's field of view, thus changing the depiction of the virtual content in the augmented reality environment based on the reference frame of the virtual content and its correlation to the position of the linkage points. As such, the virtual content may be synchronized with the position of the linkage points within the field of view of a viewing user so that the virtual content remains superimposed over the viewed user as the viewed user moves within the field of view of the viewing user.

The display control component may be configured to cause an image generated by image generation component to be displayed in an augmented reality environment via a display device. The display control component may be configured to effectuate transmission of instructions to the display device to cause the image to be displayed. Images of virtual content generated by image generation component may be presented via a display device in conjunction with the real world so that the virtual content appears as if it exists in the real world. The display control component may be configured to cause updated images of virtual content to be displayed in the augmented reality environment via a display device in real-time.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
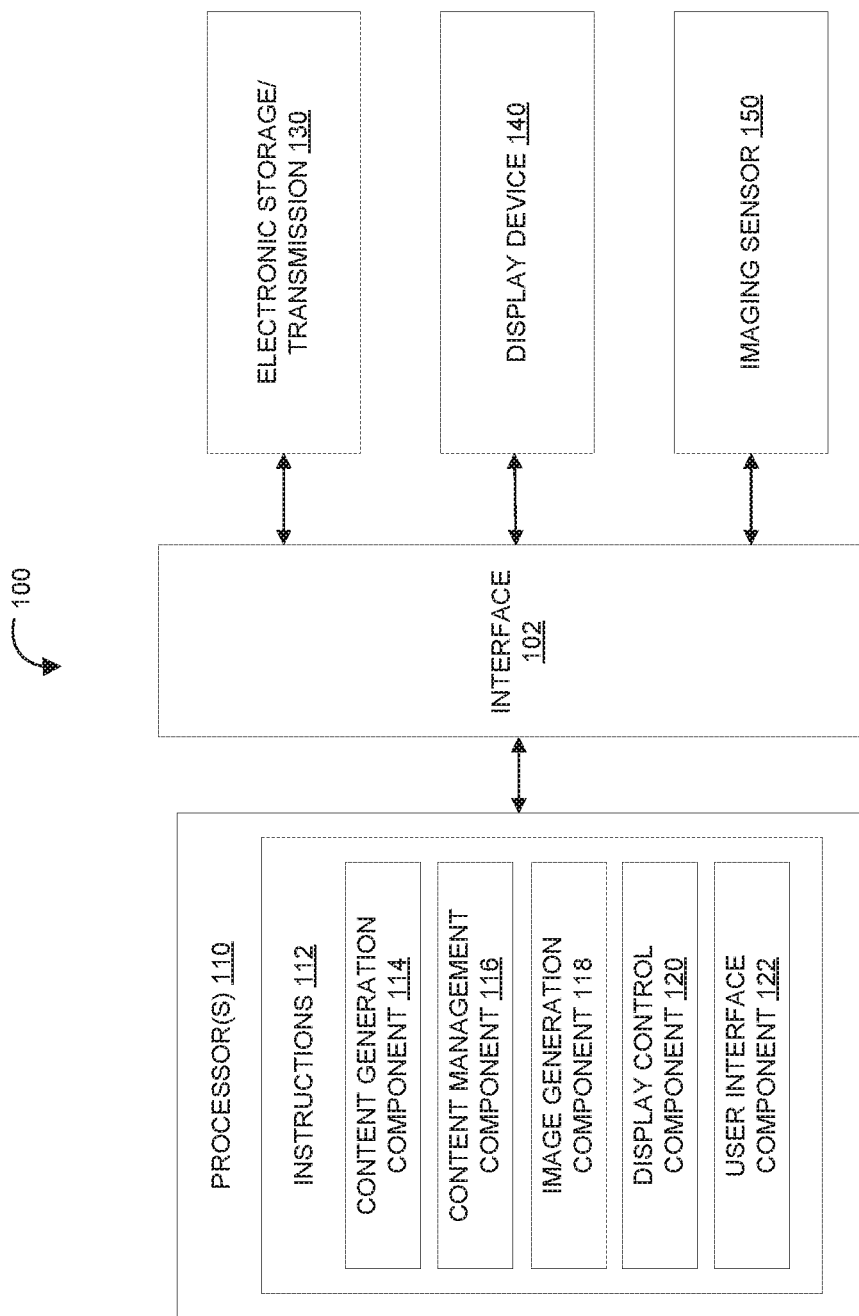
FIG. 1 illustrates a system for generating and facilitating access to virtual content to be presented in an augmented reality environment, in accordance with one or more implementations.

This disclosure relates to systems and methods for generating and facilitating access to virtual content to be presented in an augmented reality environment, in accordance with one or more implementations. Virtual content may refer to one or more virtual content items. Each virtual content item may be associated with one or more specific users, living entities, structures, or objects visible within a field of view of a user. A virtual content item may comprise visual or non-visual virtual content to be perceived in an augmented reality environment. For example, virtual content may comprise a two- or three-dimensional virtual image or depiction of an object, a part of an object, a surface, a texture, an effect, information, and/or other content visibly manifested in views of the augmented reality environment. In some implementations, virtual content may comprise an augmented rendering of a user or other living entity. An augmented rendering of a user or other living entity may comprise a full- or partial-body virtual content item depicted based on that user or living entity, or one or more other users or living entities. For example, a user or living entity for which virtual content may be depicted may be human and/or of one or more other species (e.g., a dog, a cat, and/or one or more other species). In various implementations, an augmented rendering of a user may be personalized by the user to comprise a desired representation of the user in an augmented reality environment. As described herein, virtual content may be rendered by a display device in an augmented reality environment based on the field of view seen through the display device and a position of linkage points in the real world.

In some implementations, the techniques described herein may be used to render virtual content in an augmented reality environment based on the user. That is, a display device of a first user may render virtual content based on a second user within the field of view of the first user while the first user and one or more other users (e.g., the second user) simultaneously visualize virtual content based on the first user. In other words, the techniques described herein may be used by individual users to view virtual content depicted in association with or superimposed over both themselves and one or more other users or living entities within their field of view. For example, the techniques described herein may enable a user to look down at their own hand and see virtual content superimposed over their hand based on the detection of linkage points of the hand and virtual content information defining virtual content to be rendered over the hand. In some implementations, a first user may see themselves (or their augmented rendering) as one or more other users see them. In other words, the augmented rendering the first user sees for themselves is the augmented rendering other users see for them. In some implementations, a first user may see themselves (or their augmented rendering) differently than the augmented rendering one or more other users see for them. In other words, the augmented rendering the first user sees for themselves may be different than the augmented rendering other users see for them. In some implementations, multiple different users may see one user differently. For example, a first user may see a third user based on a first augmented rendering, while a second user may concurrently see the third user based on a second augmented rendering. In other instances, all or multiple users may visualize a single user based on the same virtual content (or as the same augmented rendering).

It will be appreciated by those having skill in the art that the implementations described herein may be practiced without these specific details or with an equivalent arrangement. In other instances, well-known structures and devices are shown in block diagram form in order to avoid unnecessarily obscuring the implementations of the invention.

Exemplary System Architecture

FIG. 1 illustrates a system 100 for generating and facilitating access to virtual content to be presented in an augmented reality environment, in accordance with one or more implementations. The system may include one or more of interface 102, one or more physical processors 110, electronic storage 130, display device 140, imaging sensor 150, and/or other components.

The one or more physical processors 110 (also interchangeably referred to herein as processor(s) 110, processor 110, or processors 110 for convenience) may be configured to provide information processing capabilities in system 100. As such, the processor(s) 110 may comprise one or more of a digital processor, an analog processor, a digital circuit designed to process information, a central processing unit, a graphics processing unit, a microcontroller, an analog circuit designed to process information, a state machine, and/or other mechanisms for electronically processing information.

Processor(s) 110 may be configured to execute one or more computer readable instructions 112. Computer readable instructions 112 may include one or more computer program components. Computer readable instructions 112 may include one or more of content generation component 114, content management component 116, image generation component 118, display control component 120, user interface component 122, and/or other computer program components. As used herein, for convenience, the various computer readable instructions 112 will be described as performing an operation, when, in fact, the various instructions program the processor(s) 110 (and therefore system 100) to perform the operation.

Content generation component 114 may be configured to generate and modify virtual content to be displayed in an augmented reality environment. In various implementations, content generation component 114 may be configured to generate and/or modify an augmented rendering of a user or living entity to be displayed in an augmented reality environment. An augmented rendering of a user or other living entity may comprise a full- or partial-body virtual content item depicted based on that user or living entity, or one or more other users or living entities. A user or living entity for which virtual content (e.g., an augmented rendering) may be depicted could be human and/or of one or more other species (e.g., a dog, a cat, and/or one or more other species). In various implementations, an augmented rendering of a user may be personalized by the user to comprise a desired representation of the user in an augmented reality environment. When displayed in an augmented reality environment, an augmented rendering of a user may emulate the effects of gravity on the body and realistically portray deformations related to the underlying muscle and body skeleton—especially during movement.

In various implementations, an augmented rendering of a user may comprise virtual content that may be superimposed over the entirety of the appearance of a user within the field of view of the user such that the view of the user as they would appear in the real-world is effectively replaced by the augmented rendering. In some implementations, an augmented rendering of a user may comprise virtual content that may be superimposed over only a portion of the appearance of a user within the field of view of the user such that the remainder of the view of the user may appear as it appears in the real-world. For example, an augmented rendering of a user may comprise virtual content that is superimposed over only a portion of the appearance of the user (e.g., the head, face, torso, clothing, one or more missing or artificial limbs, and/or one or more other portions of the appearance of the user) and the remainder of the view of the user (e.g., the arms, legs, feet, and/or one or more other portions of the appearance of the user) may appear as it appears in the real-world.

In some implementations, content generation component 114 may be configured to generate virtual content information defining virtual content using three-dimensional animation techniques, using three-dimensional drawings (e.g., using computer-aided design (CAD) software), based on three-dimensional photography of real-world objects, based on still images and/or videos captured with a three-dimensional camera, using three-dimensional graphic modeling techniques, and/or using other techniques now known or future developed for generating three-dimensional content. In various implementations, content generation component 114 may be configured to generate an augmented rendering of a user based on an individualized texture map (or "skin") using a three-dimensional full body scan and/or using other techniques now known or future developed for generating three-dimensional content.

In various implementations, content generation component 114 may be configured to obtain one or more images of a user. The one or more images of the user may comprise a three-dimensional full body scan of the user, multiple two-dimensional images of the user, and/or one or more other images of a user. In some implementations, images captured of a user may capture missing or artificial limbs. In other words, the images may indicate that a user is missing a limb and/or possesses an artificial limb, which may be used by content generation component 114 to generate an augmented rendering of the user. For example, content generation component 114 may be configured to generate an augmented rendering of a user that includes or does not include a missing or artificial limb (e.g., based on the user's preference and selections when modifying their augmented rendering).

In various implementations, one or more images of a user may be obtained via a user device of the user and/or via a network (e.g., via the Internet, cloud storage, and/or one or more other networks), For example, a user device of a user may comprise an application configured to capture a series of two-dimensional images of the user and/or assemble a three-dimensional model or image of the user that may be obtained by content generation component 114. In some implementations, display device 140, imaging sensor 150, and/or one or more other components of system 100 may be configured to capture and/or obtain one or more images of a user and facilitate access to the one or more images of the user to content generation component 114. In some implementations, one or more other devices may be used to capture and/or obtain one or more images of a user. For example, a gaming console may utilize a camera and sensor to capture and/or obtain one or more images of a user and facilitate access to the one or more images of the user to content generation component 114. In some implementations, one or more cameras (which may include imaging sensor 150) may be utilized to capture the one or more images of the user. For example, a depth camera, a stereoscopic camera, and/or one or more other cameras may be used to capture the one or more images of the user.

In various implementations, content generation component 114 may be configured to generate a three-dimensional representation of a user. For example, content generation component 114 may be configured to generate a three-dimensional representation of a user based on one or more images of the user. In some implementations, content generation component 114 may be configured to utilize one or more techniques now known or future developed to generate a three-dimensional representation of a user based on one or more images of the user.

In various implementations, content generation component 114 may be configured to modify a three-dimensional representation of a user. For example, in some implementations, content generation component 114 may be configured to modify a three-dimensional representation of a user based on input provided by a service provider. In some implementations, a third-party service provider may make preliminary modifications to an augmented rendering of a user and cause the modified augmented rendering of the user to be provided to content generation component 114 for further modification by the user. Modifications made by a service provider, or based on user input from a service provider may be related to enhancing the augmented rendering (e.g., the resolution of the augmented rendering and/or one or more other aspects related to the quality of the augmented rendering), related to one or more modifications offered by the service provider (e.g., a service provider may offer services related to enhancing an augmented rendering or otherwise modifying an augmented rendering based on user preferences), related to compliance with one or more specifications of a subscription service used or otherwise related to the system described herein, and/or otherwise modify the augmented rendering. In some implementations, a third-party service provider may generate a three-dimensional representation (or augmented rendering) of a user and provide the generated three-dimensional representation (or augmented rendering) of the user to the system. In some implementations, content generation component 114 may be configured to modify a three-dimensional representation (or augmented rendering) of a user generated by a third-party service provider.

In various implementations, content generation component 114 may be configured to modify a three-dimensional representation of a user based on user input. In some implementations, content generation component 114 may be configured to obtain user input indicating a request to modify the three-dimensional representation of a user. For example, the user input may be obtained via a user interface generated by user interface component 122. User input may comprise physical input received via a user device, voice input, gesture-based input, input based on movement of the display device, input based on user eye movement, and/or one or more other types of user input.

In various implementations, an augmented rendering of a user may be modified offline and/or by the content generation component 114 in real-time. For example, in some implementations, an augmented rendering of a user may be modified offline by a service provider and/or based on user input. In some implementations, an augmented rendering of a user may be modified in real-time based on user input. For example, content generation component 114 may be configured to modify an augmented rendering of a user in real-time. In some implementations, content generation component 114 may be configured to modify an augmented rendering of a user in real-time while the augmented rendering is simultaneously in an augmented reality environment.

A request to modify a three-dimensional representation of a user may comprise a request to modify one or more parameters of the three-dimensional representation of the user. Modifying the parameters may alter the appearance, movements, animation, tactile feedback, and/or other aspects of the three-dimensional representation. By modifying the parameters of a three-dimensional representation, a user is able to personalize the three-dimensional representation in a manner that is limited only by their imagination.

Modifications to a three-dimensional representation may include modifications related to the size of a three-dimensional representation. For example, a user may modify the height, weight, or width of a three-dimensional representation. Modifying the height or weight may modify the entirety of the three-dimensional representation or specific aspects of the three-dimensional representation. For example, a user may request to add weight to only certain aspects of the three-dimensional representation. When modifying the width of the three-dimensional representation, a user may indicate what aspects of the three-dimensional representation they wish to modify, whether they wish to make those aspects wider or narrower, and by how much. By doing so, a user may customize the overall shape of the three-dimensional representation.

Modifications to a three-dimensional representation may include modifications to specific aspects of a three-dimensional representation. A user may modify muscle tone, curviness, skin tone or other coloring (e.g., blushing), body proportions, and/or other aspects of a three-dimensional representation. For example, a user may modify skin tone to make the skin tone of a three-dimensional representation appear lighter, darker, sub-burned, a different color (e.g. blue, purple, or green). A user may alter the appearance of hair on the three-dimensional representation. For example, a user may add hair, remove hair, change the color of hair, and/or change the style of the hair that does or does not appear on the originally generated three-dimensional representation. A user may modify a three-dimensional representation to simulate plastic surgery. For example, a three-dimensional representation may be modified to alter breast size, modify the placement or shape of breasts, alter the appearance of breasts to account for gravity, and/or alter the appearance of a nose, a chin, or other features of a user's appearance. A user may modify a three-dimensional representation to address one or more undesirable features. For example, a user may remove undesirable weight or fat in certain areas specified by the user (e.g., under the chin or around the waist).

In various implementations, content generation component 114 may be configured to programmatically modify a three-dimensional representation of a user based on user input indicating a request to modify one or more specific parameters and/or one or more requests to modify the three-dimensional representation based on predefined (or preprogrammed) options. For example, a predefined option may relate to body type, age (or age range), one or more desirable features, one or more undesirable features, addition, removal, and/or replacement of one or more body parts, and/or one or more other predefined options related to a three-dimensional representation. In some implementations, content generation component 114 may be configured to receive an indication of a selection of a predefined option and programmatically modify the three-dimensional representation based on the selection. In an exemplary implementation, a user may select an athletic body type and content generation component 114 may be configured to programmatically adjust the appearance of muscle tone, body fat, and/or other aspects of the three-dimensional representation based on the selection. In an exemplary implementation, a user may select a predefined option to appear younger and content generation component 114 may be configured to programmatically adjust the appearance of wrinkles, crow's feet, smile lines, and/or other aspects of the three-dimensional representation based on the selection. In an exemplary implementation, a user may select a predefined option to augment breast size and content generation component 114 may be configured to programmatically adjust the appearance of the three-dimensional representation based on the selected breast size. In an exemplary implementation, a user that was born without one or more limbs, lost one or more limbs in combat, or is missing one or more limbs for one or more other reasons may select a predefined option to replace a missing limb and content generation component 114 may be configured to programmatically modify the appearance of the three-dimensional representation to include the missing limb. In some implementations, an augmented rendering of a user may be provided to a service provider (e.g., a third-party service provider) that may programmatically modify the augmented rendering of the user at their request.

Figure 2:
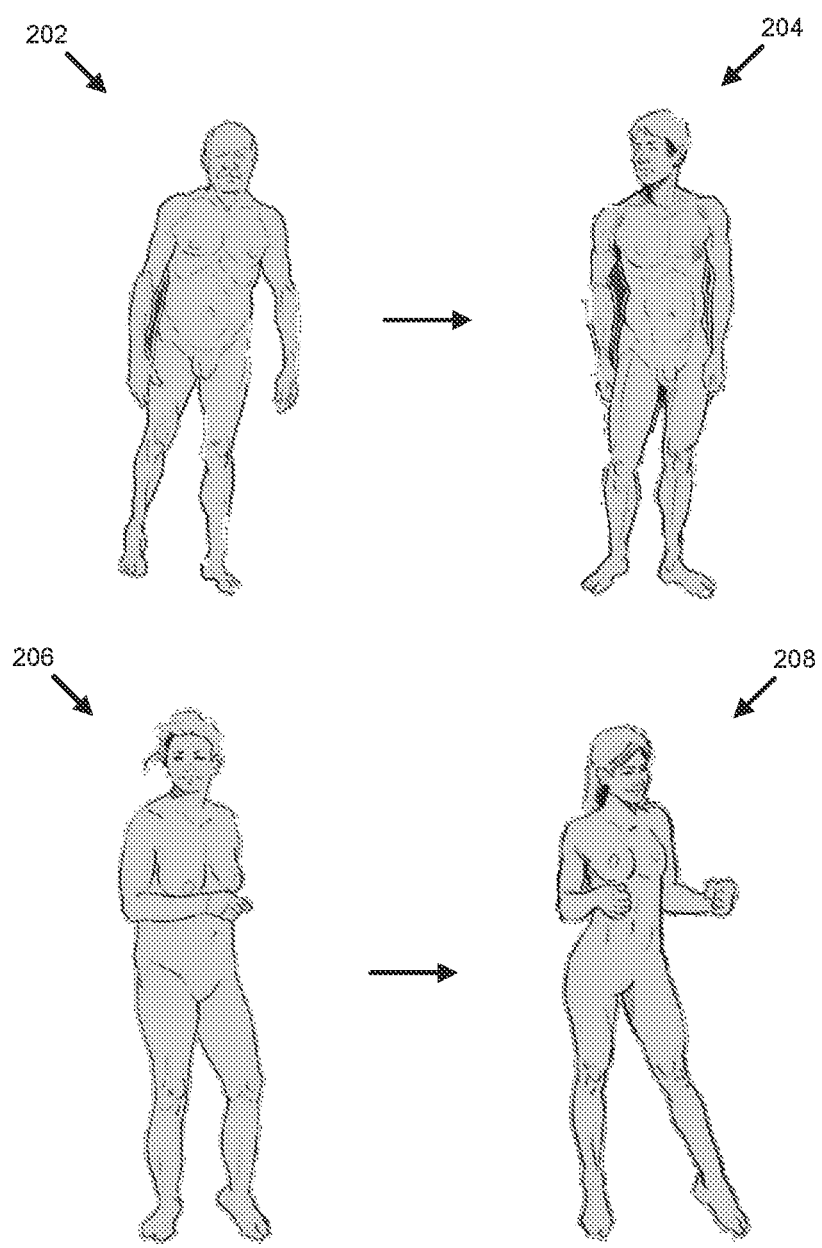
FIG. 2 illustrates various exemplary three-dimensional representations generated for one or more users, in accordance with one or more implementations.

For example, and referring to FIG. 2, various exemplary three-dimensional representations generated for one or more users are depicted, in accordance with one or more implementations. For example, representation 202, representation 204, representation 206, and representation 208 may comprise three-dimensional representations generated by content generation component 114 based on one or more images of a user. For example, representation 202 and representation 206 may comprise computer-generated representations depicting a male user and a female user as they appear in real-life, respectively. In various implementations, content generation component 114 may be configured to modify representation 202 and representation 206. For example, content generation component 114 may be configured to modify representation 202 based on user input received from the user depicted by representation 202. The user input may comprise one or more requests from the user to modify one or more parameters of representation 202. In some implementations, content generation component 114 may be configured to programmatically modify representation 202 based on user input. For example, content generation component 114 may be configured to programmatically modify representation 202 based on user input selecting a predefined option to appear younger. Based on the user selection, content generation component 114 may be configured to programmatically modify representation 202 to appear younger, resulting in representation 204. In an exemplary implementation, content generation component 114 may be configured to modify representation 206 based on user input received from the user depicted by representation 206. For example, content generation component 114 may be configured to programmatically modify representation 206 based on user input. For example, content generation component 114 may be configured to programmatically modify representation 206 based on user input requesting to modify one or more parameters related to weight, width, and/or one or more other parameters, and/or user input selecting a predefined option to augment breast size, and/or one or more predefined options. Based on the user selection, content generation component 114 may be configured to modify the one or more parameters related to weight, width, and/or the one or more other parameters, and/or programmatically modify representation 206 to augment breast size, resulting in representation 208.

In various implementations, content generation component 114 may be configured to programmatically modify a three-dimensional representation based on stored templates and/or instructions. In some implementations, system 100 may store a template for one or more predefined options. For example, each of one or more predefined options related to desirable features may be associated with a template. As such, system 100 may store a template for ideal physique, flawless skin, and/or one or more other desirable features.

In various implementations, content generation component 114 may be configured to programmatically implement symmetrical changes made to a three-dimensional representation. For example, if a user modifies one or more parameters related to muscle tone in the left arm of a three-dimensional representation, content generation component 114 may be configured to programmatically implement symmetrical changes to the right arm.

In some implementations, content generation component 114 may be configured to generate a three-dimensional representation of a user based on user selection of one or more predefined three-dimensional representations. For example, a predefined three-dimensional representation may comprise a known individual or celebrity (such as a professional athlete, famous actor, musician, or other real-life individual dead or alive), a fictional character (such as a movie character, a cartoon character, a character from a video game, and/or other fictional character), a stock character generated for display in an augmented reality environment, and/or another predefined three-dimensional representation. For example, and referring to FIG. 3, virtual content 304 may comprise a predefined three-dimensional representation.

In some implementations, virtual content information defining predefined three-dimensional representations may include parameters based on the known individual or celebrity, fictional character, stock character generated for display in an augmented reality environment, or other individual upon which the representation is based. For example, tactile feedback may be predefined based on the individual upon which the representation is based. The tactile feedback may simulate the feeling of scales, fur, skin (e.g., dolphin skin, alien skin, or other skin), leather, scars, and/or other feature physically recognizable via touch. Access to certain predefined three-dimensional representations may be licensed from one or more entities in possession of the image rights, copyright, trademark, and/or other rights potentially infringed by the display of the predefined three-dimensional representation in an augmented reality environment.

In various implementations, a user may select a predefined three-dimensional representation from a list of predefined three-dimensional representations presented to the user via a user interface generated by user interface component 122. For example, the list of predefined three-dimensional representations may comprise predefined three-dimensional representations obtainable via a marketplace, a catalog, and/or other source of predefined three-dimensional representations. In some implementations, content generation component 114 may be configured to obtain a predefined three-dimensional representation from a marketplace, a catalog, and/or other source of predefined three-dimensional representations in response to user input selecting the predefined three-dimensional representation. For example, content generation component 114 may be configured to download a predefined three-dimensional representation from an online marketplace, online catalog, and/or other source of predefined three-dimensional representations in response to user input selecting the predefined three-dimensional representation.

In various implementations, content generation component 114 may be configured to generate a three-dimensional representation of a user based on the obtained predefined three-dimensional representation. In some implementations, content generation component 114 may be configured to modify a three-dimensional representation of a user by modifying a predefined three-dimensional representation selected by and obtained for a user.

The techniques described herein may be used to generate an augmented rendering of one or more other users, one or more other living entities, and/or other virtual content to be displayed in an augmented reality environment.

In various implementations, content generation component 114 may be configured to store a three-dimensional representation. Storing a three-dimensional representation may comprise storing information defining the three-dimensional representation. In some implementations, content generation component 114 may be configured to store a three-dimensional representation of a user generated based on one or more images of the user with or without one or more modifications to the three-dimensional representation. As such, content generation component 114 may be configured to enable a user to personalize the three-dimensional representation of the user as the user sees fit. In various implementations, content generation component 114 may be configured to store a three-dimensional representation of a user in electronic storage 130 in association with an indication that the three-dimensional representation relates to the user. The stored three-dimensional representation of a user may comprise an augmented rendering of the user.

In various implementations, content generation component 114 may be configured to store a three-dimensional representation of a user in association other information. For example, electronic storage 130 may be configured to store virtual content information. Virtual content information may relate to one or more specific users and define virtual content of the user (e.g., the augmented rendering of the user), a reference frame of the virtual content, a correlation between the reference frame of the virtual content and one or more linkage points, and/or other information related to the virtual content. When depicted in an augmented reality environment, the correlation between the reference frame of the virtual content and one or more linkage points may cause a three-dimensional representation of a user to appear as an augmented rendering of the user. In other words, the user will appear as the augmented rendering as if they looked and moved like the augmented rendering in real-life.

Figure 3:
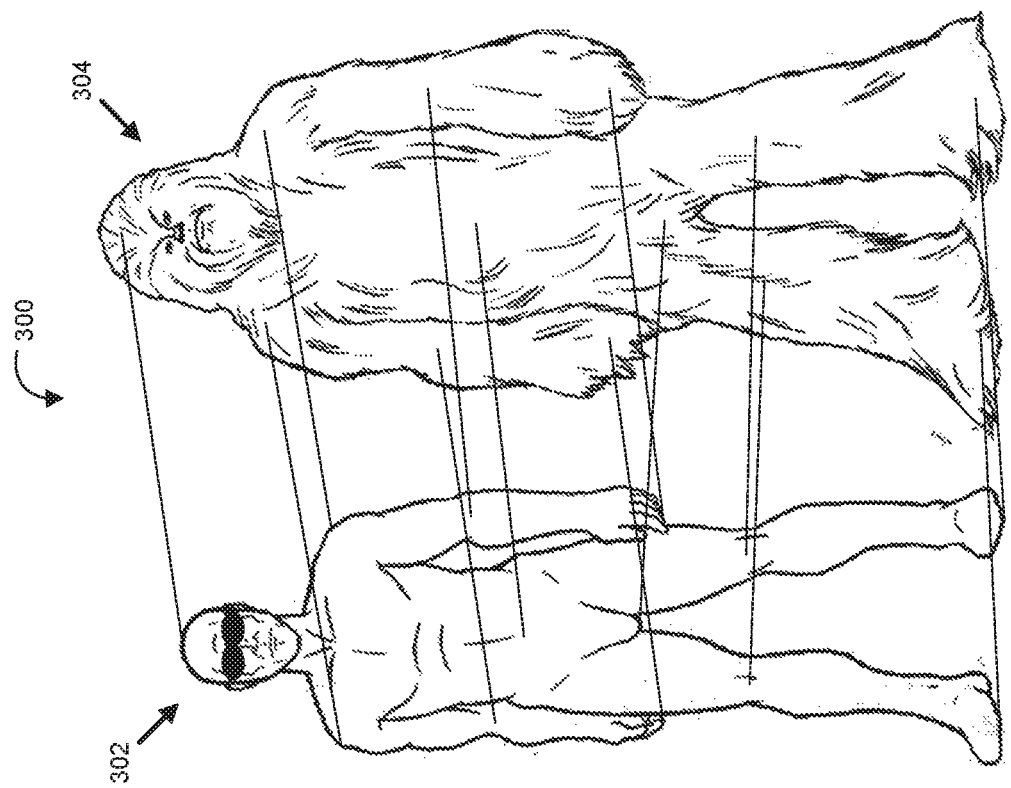
FIG. 3 illustrates an exemplary correlation between an arrangement of linkage points defined with respect to a user and a reference frame of virtual content, in accordance with one or more implementations.

For example, and referring to FIG. 3, exemplary correlation 300 between an arrangement of linkage points defined with respect to a user and a reference frame of virtual content is depicted, in accordance with one or more implementations. Exemplary correlation 300 may define how virtual content 304 may be rendered and appear superimposed over or in conjunction with a view of user 302 in the augmented reality environment. Particular linkage points on user 302 may be matched with particular predefined points on virtual content 304. A given linkage point of user 302 may be matched with a given point of virtual content 304 based on the arrangement of the linkage points of user 302 and/or based on a pre-defined correlation between linkage points defined with respect to particular features of user 302 (i.e., the head, abdomen, knees, feet, etc.) and points of virtual content 304 associated with corresponding features of a living entity. User 302 is depicted wearing glasses in exemplary correlation 300. The glasses worn by user 302 might or might not be included (or depicted) in an augmented reality environment in which user 302 is depicted, and may or may not be involved in the rendering of virtual content in an augmented reality environment by system 100, as described further below with respect to FIG. 5A and FIG. 5B.

In some implementations, content generation component 114 may be configured to modify and/or update the correlation between the reference frame of virtual content and an arrangement of linkage points. For example, content generation component 114 may be configured to modify and/or update the correlation between the reference frame of virtual content and an arrangement of linkage points as described in co-pending U.S. patent application Ser. No. 15/893,498, entitled "SYSTEMS AND METHODS FOR UTILIZING A LIVING ENTITY AS A MARKER FOR AUGMENTED REALITY CONTENT," the disclosure of which is hereby incorporated by reference in its entirety herein.

Content management component 116 may be configured to manage and facilitate access to virtual content information defining virtual content to be rendered in an augmented reality environment. In various implementations, content management component 116 may be configured to obtain virtual content information defining virtual content and transmit, provide, or otherwise make available the virtual content information to image generation component 118 and/or one or more other users. For example, content management component 116 may be configured to interface with electronic storage 130 to obtain virtual content information and cause virtual content information to be provided to image generation component 118 and/or one or more other users. In some implementations, content management component 116 may be configured to cause virtual content information to be transmitted to a device of one or more other users.

In various implementations, content management component 116 may be configured to manage access to virtual content associated with a user. For example, virtual content of a user may be associated with permission information. The permission information may indicate that only certain users may access the virtual content of the user. For example, the permission information associated with virtual content of a user may indicate that only other users that are subscribers may access the virtual content of the user. In various implementations, content management component 116 may be configured to determine whether one or more users are subscribers and facilitate access to virtual content of the user only to other users that are subscribers. As used herein, a subscriber may comprise a participant in an augmented reality system or service that has authorized access to virtual content information of at least one or more other users (or subscribers).

In various implementations, a viewing user associated with display device 140 may select the content that is displayed in an augmented reality environment via display device 140. For example, a viewing user may select from a list of available content (e.g., via a user interface generated by user interface component 122). When a viewing user selects from a list of available content, content management component 116 may be configured to obtain virtual content information for the selected content. However, the content that a viewing user is able to select for any given viewed user may be limited by the viewing user's subscription information, permission information associated with virtual content, and/or other access controls.

In various implementations, the content that is available to a viewing user for a given viewed user may be controlled by the viewed user. In other words, a viewed user may control the virtual content information that is transmitted to, and/or otherwise accessible by, a viewing user. Each user may have one or more augmented renderings and each augmented rendering of a user may have numerous identifiable aspects. For example, identifiable aspects may comprise different components, colors, sounds, and/or other features of an augmented rendering. In various implementations, a viewed user may indicate that different individual users, different groups of users, and/or users with different subscription levels may access one or more different augmented renderings and/or different aspects of one or more augmented rendering. As such, a user may select which augmented rendering(s) and/or aspects of their augmented rendering(s) they wish to allow other users to access.

In one exemplary implementation, a viewed user may indicate that all but a handful of users will have access to just a first augmented rendering of the viewed user, and the remaining handful of users will have access to just a second augmented rendering of the viewed user. As such, the viewed user dictates exactly which augmented rendering of the viewed user each other user may access. Therefore, the viewed user dictates exactly how they will be seen by each other user.

In a second exemplary implementation, a viewed user may indicate that all but one group of users will have access to a first set of three augmented renderings of the viewed user, and the remaining group of users will have access to one or more of the first set of three augmented renderings as well as a fourth augmented rendering not within the first set of three. In this second exemplary implementation, the viewed user allows each user that visualizes the viewed user in an augmented reality environment to choose between multiple augmented renderings for the viewed user, with only one group able to choose from an additional augmented rendering not available to others (i.e., the fourth augmented rendering now within the first set of three).

In a third exemplary implementation, a viewed user may indicate that all but one group of users will have access to a first set of three augmented renderings of the viewed user, and the remaining group of users will have access to only one augmented rendering within the first set of three augmented renderings. In this third exemplary implementation, the viewed user allows some users (all but the identified group) to choose between multiple augmented renderings to display in an augmented reality environment based on the viewed user, while that remaining group does not get to choose and may only see the viewed user as the one augmented rendering specified.

In each of the three exemplary implementations described above, the list of available content for the viewed user from which a viewing user is able to select is limited by the viewed users' selections regarding what content is available to the viewing user.

In various implementations, the content that is available to a viewing user for a given viewed user may be location-based, weather-based, temporal (e.g., based on the time of day, day of week, month of year, season, and/or one or more other time constraints), based on one or more events, and/or otherwise based on one or more external factors. For example, a viewed user may indicate that a given augmented rendering of the viewed user is available only at a geographically-definable location. A geographically-definable location may comprise a geographic location bounded by one or more boundaries, a proximity, and/or otherwise definable boundaries. In some implementations, a viewing user may have access to certain virtual content of a viewed user when the viewing user and/or the viewed user are within a geographically-definable location. In some implementations, the location of a viewed user and/or a viewing user may be obtained based on location information obtained from a GPS component of a user device, display device 140, and/or other device associated with the viewing user and/or the viewed user. In various implementations, permission information for given virtual content will indicate whether (and how) that virtual content is limited by location, the weather, time constraints, one or more events (i.e., access is limited to one or more viewing user participated or associated with a given event), and/or one or more other factors.

In various implementations, content management component 116 may be configured to determine the virtual content that is available to a viewing user for a given viewed user based on permission information for the content, subscription information for the viewing user, and/or other information. For example, an indication of which content is available and to which user may be determined based on the permission information, the subscription information. In some implementations, content management component 116 may be configured to determine the virtual content that is available to a viewing user for a given viewed user based on permission information for the virtual content of the viewed user and subscription information for the viewing user. In some implementations, the permission information for given virtual content may indicate when, where, how, and to whom virtual content is accessible. For example, the permission information may indicate that certain virtual content is accessible only in certain locations, at certain times, during certain conditions, to specific users, and/or to users with specific subscription levels. In some implementations, the subscription information may indicate a subscription level for a given viewing user. In some implementations, content management component 116 may be configured to determine the virtual content that is accessible to a viewing user by determining a subscription level of the viewing user and identifying virtual content that is available to that subscription level based on permission information for virtual content of a viewed user. For example, for a given subscription level, content management component 116 may be configured to identify virtual content that is available to that subscription level in a certain location, at a certain time, under certain conditions, and/or based on one or more other factors.

In various implementations, content management component 116 may be configured to detect a user or other living entity and one or more linkage points for the user or other living entity visible within the field of view of a user. For example, content management component 116 may be configured to detect a user or other living entity and one or more linkage points for the user or other living entity visible within the field of view of a user as described in co-pending U.S. patent application Ser. No. 15/893,498, entitled "SYSTEMS AND METHODS FOR UTILIZING A LIVING ENTITY AS A MARKER FOR AUGMENTED REALITY CONTENT," the disclosure of which is hereby incorporated by reference in its entirety herein.

In various implementations, content management component 116 may be configured to identify another user visible within a field of view of a user. For example, content management component 116 may be configured to identify another user visible within a field of view of a user as seen via display device 140. The identification of the user may comprise a specific user, a type or predefined group of users (e.g., family, friends, co-workers, teammates, and/or other group of users associated with the user), and/or other one or more other identifications of the user.

In various implementations, content management component 116 may be configured to identify a user using facial recognition or body recognition, by recognizing a transponder associated with one or more specific users, by recognizing a user device associated with one or more specific users, based on audio information associated with one or more specific users, by recognizing one or more specific users within the field of view of the user associated with one or more specific users, and/or using one or more other recognition techniques. For example, content management component 116 may be configured to identify a user based on biometric recognition of the user, based on communication between display device 140 and a device of the user, using geolocation proximity information identifying users within a certain proximity, based on one or more linkage points and/or features of a user (e.g., markers, jewelry, clothing, significant body parts, tattoos, and/or other linkage points or features of the user). In some implementations, content management component 116 may be configured to identify a user based on information received from a device of the user. For example, a device of the user may transmit information indicating the identification of the user.

In some implementations, content management component 116 may be configured to identify a user based on user selection of a user. For example, content management component 116 may be configured to identify a user based on user selection of a user received via a user interface generated by user interface component 122. In some implementations, content management component 116 may be configured to identify multiple users simultaneously.

In various implementations, content management component 116 may be configured to prompt a user of display device 140 for an indication as to whether they wish to see an augmented rendering of another user before identifying the other user or causing virtual content information of the user to be obtained. For example, content management component 116 may be configured to prompt a user of display device 140 for an indication as to whether they wish to see an augmented rendering of another user when the other user enters within a field of view of the user, comes within a proximity of the user, and/or communicates with the user via a device of the other user. In some implementations, content management component 116 may be configured to identify the other user or cause virtual content information of the other user to be obtained based on a positive response from the user (i.e., a response indicating they wish to have the user identified and/or wish to obtain virtual content information for the user). In some implementations, content management component 116 may be configured to programmatically determine whether to identify the other user or cause virtual content information of the other user to be obtained based on stored preferences related to the user of display device 140.

In various implementations, content management component 116 may be configured to obtain virtual content information defining virtual content related to another user identified within a field of view of a user. Each user, specific living entity, type of living entity, and/or group of living entities may be associated with specific virtual content. That is, virtual content information may define virtual content items to be displayed when a specific user, living entity, type of living entity, and/or group of living entities is present. In some implementations, content management component 116 may be configured to obtain virtual content information stored at one or more devices of the user. In some implementations, content management component 116 may be configured to obtain virtual content information from one or more connected devices (e.g., a device another a user visible within a field of view of the user). For example, content management component 116 may be configured to receive virtual content information from one or more connected devices (e.g., a device of another user visible within a field of view of the user). In some implementations, content management component 116 may be configured to receive virtual content information from one or more connected devices (e.g., a device of another user visible within a field of view of the user) responsive to a request for the virtual content information from the user (i.e., one or more devices of the user). In some implementations, content management component 116 may be configured to obtain virtual content information via a network (e.g., via the Internet, cloud storage, and/or one or more other networks). For example, content management component 116 may be configured to download virtual content information from the Internet or from cloud storage.

The virtual content information obtained may define the virtual content item to be displayed when the identified user is present within the field of view of the user. Based on the virtual content information obtained, content management component 116 may be configured to provide instructions to image generation component 118 to generate an image of the virtual content to be displayed in an augmented reality environment based on the virtual content information obtained via content management component 116. In some implementations, a user may select the virtual content information to be obtained by selecting the virtual content the user's wishes to display and/or modify. In such case, content management component 116 may be configured to provide instructions to image generation component 118 to generate an image of the selected virtual content to be displayed in an augmented reality environment based on the virtual content information obtained via content management component 116.

In some implementations, content management component 116 may be configured to obtain virtual content information from a sign post. For example, content management component 116 may be configured obtain virtual content information from a sign post as described in co-pending U.S. patent application Ser. No. 15/707,854, entitled "SYSTEMS AND METHODS FOR UTILIZING A DEVICE AS A MARKER FOR AUGMENTED REALITY CONTENT," the disclosure of which is hereby incorporated by reference in its entirety herein.

In some implementations, content management component 116 may be configured to determine whether virtual content information defining virtual content is locally stored or available via a device of a user, electronic storage 130, display device 140, and/or other components of system 100. Based on a determination that the virtual content information is not available via a device of a user, electronic storage 130, display device 140, or other component of system 100, content management component 116 may be configured to download virtual content information from the Internet or from cloud storage. For example, content management component 116 may be configured to automatically download virtual content information based on a determination that the virtual content information is not available via a device of a user, electronic storage 130, display device 140, or other component of system 100. In some implementations, content management component 116 may be configured to automatically download or request virtual content information from a transponder of another user or living entity, a wearable device of another user or living entity (e.g., a visor or glasses in the case of a human and/or a collar in the case of an animal), a user device (e.g., a smart phone), and/or other device of another user or living entity based on a determination that the virtual content information is not available via a device of a user, electronic storage 130, display device 140, or other component of system 100. In some implementations, content management component 116 may be configured to automatically download virtual content information from the Internet or from cloud storage responsive only to a determination that the virtual content information is not available via a device of a user, electronic storage 130, display device 140, one or more other component of system 100, a transponder of another user or living entity, a wearable device of another user or living entity, a user device (e.g., a smart phone), and/or other device of another user or living entity. In some implementations, a transponder of a viewed user, a wearable device of a viewed user, a user device, and/or other device of a viewed user may instruct content management component 116 to download virtual content information from the Internet or from cloud storage. For example, a transponder of a viewed user, a wearable device of a viewed user, a user device, and/or other device of a viewed user may have knowledge of whether virtual content information associated with the viewed user is stored or available from a source other than the Internet or cloud storage. In some implementations, content management component 116 may be configured to download virtual content information from the Internet or from cloud storage based on instructions from a transponder of a viewed user, a wearable device of a viewed user, a user device, and/or other device of a viewed user.

In various implementations, content management component 116 may be configured to obtain virtual content information defining virtual content of a user based on and/or in response to the identification of that user within a field of view defined by display device 140. For example, content management component 116 may be configured to obtain virtual content information defining an augmented rendering of a user based on the identification of that user within a field of view defined by display device 140. In some implementations, content management component 116 may be configured to obtain virtual content information defining virtual content related to a specific user from electronic storage 140 responsive to the identification of that user within a field of view defined by display device 140.

In various implementations, content management component 116 may be configured to determine whether a first user is a subscriber, or otherwise has access, to virtual content of a second user identified within a field of view of the first user. For example, content management component 116 may access subscription information for the first user. The subscription information may be stored in electronic storage 130 and indicate one or more subscriptions of the first user. In various implementations, content management component 116 may be configured to determine whether the first user is a subscriber, or otherwise has access, to virtual content of the second user based on the subscription information for the first user. In some implementations, content management component 116 may be configured to access permission information associated with the virtual content of the second user and determine what permissions are required to access the virtual content. For example, the permissions might comprise a particular subscription. Permission information for particular virtual content may be included within, or stored in association with, the virtual content information defining that particular virtual content. In various implementations, content management component 116 may be configured to obtain virtual content information defining virtual content related to a second user based on a determination that the first user is a subscriber, or otherwise has access, to the virtual content of the second user. For example, content management component 116 may be configured to obtain virtual content information defining virtual content related to a second user based on a determination that one or more subscriptions of the first user permits access to the virtual content of the second user.

In some implementations, content management component 116 may be configured to determine whether one or more other users are permitted to access virtual content of a first user generated by content generation component 114. For example, content management component 116 may be configured to determine whether one or more other users are permitted to access virtual content of a first user generated by content generation component 114 in response to a request for the virtual content from the one or more other users. In some implementations, content management component 116 may be configured to access subscription information of the second user and determine whether the second user is a subscriber, or otherwise has access, to the virtual content of the first user. Based on a determination that the second user is a subscriber, or otherwise has access, to the virtual content of the first user, content management component 116 may be configured to facilitate access to virtual content information defining the virtual content of the first user to the second user. For example, content management component 116 may be configured to cause the virtual content information defining the virtual content of the first user to be transmitted to a device of the second user.

In the event a user does not have access to virtual content of another user (or vice versa), a second user—for which a first user utilizing a display device 140 may not access the virtual content of the second user—may appear without virtual content as they would normally be seen in the real-world. In some implementations, image generation component 118 may be configured to generate an image of the second user that does not contain a display device (i.e., similar to display device 140), so that the second user does appear as they would appear in the real world without the display device.

In various implementations, content management component 116 may be configured to determine the content a viewing user has access to based on subscription information of the user and/or permission information associated with virtual content. Different subscriptions may enable a user to access different content. Subscriptions may comprise levels of access. For example, a first level subscription may provide a user with access to basic content, a second level subscription may provide a user with access to basic content as well as some additional content, and a third level subscription may provide a user with access to all content. In some implementations, a user may elect to subscribe to certain other users, groups of users, or types of users. For example, a user may select individual friends or contacts for which they wish to subscribe. In some implementations, a user may elect different subscription levels for different other users. In some implementations, a user may select which users may access their virtual content (e.g., their augmented rendering) based on their subscription level. For example, a user may indicate that different subscription levels may access different aspects of their augmented rendering and/or different augmented renderings of the user. In some implementations, a user may select which aspects of their augmented rendering and/or which of one or more augmented renderings they wish to provide to access to individual users. For example, a user may select to provide access to the entirety of their augmented rendering only to their closest friends, and provide only limited access to their augmented rendering to family and co-workers. In various implementations, a user may identify different subscription levels for one or more other users. For example, a user may identify different subscription levels for one or more of their contacts. In some implementations, a user may group different sets of users (i.e., groups) into different subscription levels. Based on the assigned subscription level, each user may specify the content they are providing to other users For example, a user may indicate that different subscription levels may access different aspects of one or more of their augmented renderings and/or different augmented renderings altogether. As such, two different users may concurrently visualize different virtual content associated with a third user. A user's selections regarding access to their virtual content may be reflected in permission information for the virtual content.

In some implementations, a viewing user may be able to determine which virtual content to which they have access. For example, a viewing user may request access to virtual content of different users, purchase additional access (e.g., by purchasing additional subscription(s) and/or pay for access to virtual content of a particular user) and/or select from available content (content accessible by the viewing user) to display in the augmented reality environment viewed by the viewing user.

In various implementations, content management component 116 may be configured to determine the subscriptions of a user based on subscription information for the user. Based on the subscriptions of the user and/or permission information associated with individual virtual content, content management component 116 may be configured to determine what virtual content, or aspects of virtual content, the user may access. Based on the subscriptions of the user and/or permission information associated with individual virtual content, content management component 116 may be configured to restrict/prohibit access to virtual content by the user. For example, content management component 116 may be configured to determine that a first user has limited access to virtual content of a second user based on permission information for the virtual content of the second user and cause image generation component 118 to generate images of virtual content to be rendered in an augmented reality environment viewed by the first user based on their limited access (i.e., without aspects of virtual content for which the first user does not have access).

In various implementations, content management component 116 may be configured to automatically obtain virtual content information defining virtual content related to a second user identified within a field of view of a first user and/or determine whether the first user is a subscriber, or otherwise has access, to virtual content of the second user identified within the field of view of the first user responsive to the identification of the second user within the field of view of the first user. For example, responsive to the identification of a second user within the field of view of a first user, content management component 116 may be configured to obtain virtual content information defining virtual content related to the second and/or determine whether the first user is a subscriber, or otherwise has access, to virtual content of the second user without further input from the first user or the second user.

In some implementations, content management component 116 may be configured to trigger images of virtual content to be rendered in an augmented reality environment. For example, content management component 116 may be configured to trigger images of virtual content to be rendered in an augmented reality environment based on triggering information and/or an arrangement of linkage points detected for a given user. In some implementations, content management component 116 may be configured to trigger images of virtual content to be rendered in an augmented reality environment as described in co-pending U.S. patent application Ser. No. 15/893,498, entitled "SYSTEMS AND METHODS FOR UTILIZING A LIVING ENTITY AS A MARKER FOR AUGMENTED REALITY CONTENT," the disclosure of which is hereby incorporated by reference in its entirety herein.

In some implementations, content management component 116 may be configured to facilitate access to virtual content information defining virtual content of user by one or more third parties. One or more third parties may provide services enabling users to utilize virtual content outside an augmented reality environment. For example, content management component 116 may be configured to facilitate access to a third party manufacturer to generate an action figure or other physical representation of virtual content generated by content generation component 118. In an exemplary implementation, content management component 116 may be configured to cause virtual content information defining virtual content of a user to be transmitted to a 3-D printer. In the foregoing exemplary implementation, the virtual content may comprise an augmented rendering of a user and transmitting at least a portion of the virtual content information and instructions to the 3-D printer may cause the 3-D printer to generate an action figure or other physical representation of the augmented rendering of the user.

In some implementations, content management component 116 may be configured to facilitate access to virtual content information defining virtual content of user to enable use of the virtual content in one or more interactive games. For example, content management component 116 may be configured to facilitate access to virtual content information, defining virtual content, by one or more third parties (e.g., one or more third party applications and/or third party servers) associated with an interactive game. For example, content management component 116 may be configured to transmit at least a portion of virtual content information defining an augmented rendering of a user to one or more third parties to enable the augmented rendering of the user to be utilized in an interactive game.

When used in the interactive game, the augmented rendering of the user may be utilized as, or incorporated into, an avatar of the user. An avatar of a user may comprise an icon or figure representing a particular person when the person is not physically present, such as when a user is remote or for use in an interactive game. In an exemplary implementation, an augmented rendering of a user that is utilized as an avatar in an interactive game may be based on a known individual or celebrity, a fictional character, a stock character generated for display in an augmented reality environment, and/or other predefined three-dimensional representation. As such, a third party may enable a user, through access to virtual content information defining virtual content of the user, to utilize an augmented rendering of a user that is based on a fictional character as an avatar for the user in the interactive game.

In some implementations, a user may activate an interactive game on a user device, display device 140, and/or one or more other devices associated with the user. In the interactive game, the user may be prompted to utilize an augmented rendering of the user in the interactive game. Responsive to an indication from a user indicating they wish to utilize the augmented rendering of the user in the interactive game, content management component 116 may be configured to facilitate access to at least a portion of virtual content information defining the augmented rendering to enable use of the augmented rendering in the interactive game.

In an exemplary implementation, content management component 116 may be configured to receive a request to access virtual content information defining virtual content of a user from a third party application related to an interactive game. Prior to facilitating access to the virtual content information, content management component 116 may be configured to prompt the user for input indicating whether the user wishes to permit access to the virtual content information by the third party application. For example, content management component 116 may be configured to prompt the user via a user interface generated by user interface component 122. Responsive to receipt of user input indicating a desire to permit access to the virtual content information, content management component 116 may be configured to facilitate access to the virtual content information by the third party application. Facilitating access to the virtual content information by the third party application may permit the third party application to utilize the augmented rendering of the user in the interactive game.

Image generation component 118 may be configured to generate an image of virtual content to be displayed in an augmented reality environment. In various implementations, image generation component 118 may be configured to generate an image of virtual content to be displayed in an augmented reality environment visible via display device 140. Images of virtual content generated by image generation component 118 may be presented via a display of display device 140 in conjunction with the real world so that the virtual content appears as if it exists in the real world. In various implementations, image generation component 118 may be configured to generate an image of virtual content to be displayed in an augmented reality environment based at least on a user's field of view and virtual content information obtained via content management component 116. In some implementations, image generation component 118 may be configured to generate images of multiple virtual content items or sets of virtual content to be displayed in the augmented reality environment simultaneously. For example, a first virtual content item based on a first reference frame may be depicted simultaneously with a second virtual content item based on a second reference frame. The techniques described herein may be used to generate an image of any virtual content to be displayed in an augmented reality environment.

In various implementations, image generation component 118 may be configured to generate an image of virtual content to be displayed in an augmented reality environment based on a user's field of view. When utilizing display device 140, a display of the display device may contain a view of the real world based on the user's field of view. A user's field of view may be defined based on orientation information, location information, and/or other information. For example, a user's field of view may be defined based at least on orientation information associated with display device 140 and location information associated with display device 140. Orientation information may define an orientation of display device 140. In some implementations, the orientation of display device 140 may refer to one or more of a pitch angle, a roll angle, a yaw angle, and/or other measurements. Orientation information may be obtained from an orientation sensor of display device 140. When looking through display device 140, the orientation of display device 140 may indicate the direction of a user's gaze. In some implementations, one or more eye tracking techniques now known or future developed may be used to determine the direction of gaze of a user. For example, display device 140 may capture the images of a user within a display device and extract a position of the user's eyes. The position of the user's eyes may be used to determine a more precise indication of the direction of the user's gaze. Location information may identify a physical location of display device 140. In some implementations, the physical location of display device 140 may refer to the geographic location of display device 140. Location information may identify a physical location based on GPS coordinates, an address, a relative position with respect to one or more identified locations, and/or other information. Location information may be obtained from a GPS component of a user device, display device 140, and/or other component of system 100. By determining the direction of a user's gaze and the user's physical position in the real world, a user's field of view may be determined.

In various implementations, image generation component 118 may be configured to generate an image of virtual content to be displayed in an augmented reality environment based on virtual content information obtained via content management component 116. In implementations in which the virtual content comprises an augmented rendering of a user, the image of the augmented rendering may comprise a three-dimensional virtual image of the augmented rendering. In other words, the augmented rendering of a user may comprise a three-dimensional representation of the user displayed in an augmented reality environment. Virtual content information may define virtual content (or a set of virtual content), a reference frame of the virtual content, and/or a correlation between linkage points and the reference frame of the virtual content. Linkage points may be defined with respect to a user in the real world. The linkage points may serve as an anchor for the reference frame of the virtual content. As such, when rendered in an augmented reality environment by display device 140, the virtual content may appear within a user's field of view based on how the reference frame of the virtual content is correlated to the real world by virtue of the position of the linkage points in the real world.

In some implementations, image generation component 118 may be configured to generate an image of an augmented rendering of a user comprising a series of dynamically sized pieces or plates that overlay the appearance of the user in the augmented reality environment. In some implementations, image generation component 118 may be configured to generate an image of an augmented rendering of a user comprising a series of dynamically sized triangles creating polygons that overlay the appearance of the user in the augmented reality environment.

In various implementations, image generation component 118 may be configured to generate an image of an augmented rendering of a user based on the location of one or more linkage points of the user within a field of view seen through display device 140. The linkage points may comprise indicators, transponders, stitching points, and/or other identified points. The linkage points associated with a user may serve as an anchor for the reference frame of virtual content. As such, the position of the linkage points in the real world may define the reference frame of virtual content with respect to the real world. For example, a set of multiple linkage points may serve as an anchor for the reference frame of virtual content by orienting the virtual content based on a correlation between the reference frame of the virtual content and the arrangement of the set of linkage points. In various implementations, the space between each of the set of linkage points and/or the arrangement of the set of linkage points may provide information as to orientation, size, and direction of virtual content.

In various implementations, the linkage points may be defined with respect to a user or living entity. In various implementations, multiple linkage points may be defined with respect to a user or living entity in order to provide orientation for virtual content. In some implementations, one or more linkage points may be located on and/or generated by one or more devices of a user or living entity. In some implementations, the linkage points may be located on one or more articles of clothing worn by a user or living entity. In some implementations, the linkage points may be located on and/or comprise one or more items worn and/or affixed to a user or living entity. In some implementations, the linkage points may be defined by one or more body parts of a user or living entity. For example, one or more significant body parts may serve as linkage points for content.

In some implementations, the linkage points may be defined by a standardized linkage point. For example, a standardized linkage point may comprise a specific geometric shape, such as a "+" which would provide information associated with the linkage point. In some implementations, the standardized linkage point may comprise an asymmetric geometric shape so as to provide orientation for virtual content without requiring multiple linkage points. In various implementations, multiple linkage points, each defined by a standardized linkage points, may serve as an anchor for the reference frame of virtual content (i.e., orient the virtual content based on a correlation between the reference frame of the virtual content and the arrangement of the multiple linkage points). For example, in some implementations, at least 2 or 3 linkage points may collectively serve as an anchor for the reference frame of virtual content. Information associated with the linkage point may comprise an indication of a correlation between the linkage point and a reference frame of virtual content to be displayed in the augmented reality environment based on at least that linkage point.

In some implementations, the linkage points may be defined by one or more specific colors. For example, the linkage points may be defined by predefined colors associated with one or more specific linkage points to be synchronized with one or more points of virtual content. In some implementations, the linkage points may be defined by one or more specific sound patterns. For example, the linkage points may be defined by predefined sound patterns associated with one or more specific linkage points to be synchronized with one or more points of virtual content. In some implementations, linkage points may be defined by LED or infrared-based images or patterns. In some implementations, an IR camera and/or IR sensor may be used to identify linkage points defined by LED or infrared-based images or patterns. Display device 140 and/or imaging sensor 150 may comprise or be physically located in an IR camera capable of identifying linkage points defined by LED or infrared-based images or patterns.

In various implementations, virtual content information may define a correlation between one or more linkage points and one or more points associated with virtual content. For example, one or more points defining an augmented rendering of a user (and its reference frame) in three-dimensional space may be correlated to one or more linkage points of the user. Therefore, a reference frame for virtual content may be anchored to multiple linkage points simultaneously.

In some implementations, the one or more linkage points described herein may refer to one or more linkage points described in co-pending U.S. patent application Ser. No. 15/893,498, entitled "SYSTEMS AND METHODS FOR UTILIZING A LIVING ENTITY AS A MARKER FOR AUGMENTED REALITY CONTENT," the disclosure of which is hereby incorporated by reference in its entirety herein.

In various implementations, image generation component 118 may be configured to identify and/or detect one or more linkage points and/or the location of one or more linkage points within the field of view of a user. For example, one or more linkage points may comprise body parts of a user or living entity and image generation component 118 may be configured to identify and/or detect one or more linkage points and/or the location of one or more linkage points within the field of view of a user using one or more image recognition techniques, object recognition techniques, and/or body recognition techniques. In some implementations, individual linkage points and/or an arrangement of multiple linkage points may be identified and/or detected as described in co-pending U.S. patent application Ser. No. 15/893,498, entitled "SYSTEMS AND METHODS FOR UTILIZING A LIVING ENTITY AS A MARKER FOR AUGMENTED REALITY CONTENT," the disclosure of which is hereby incorporated by reference in its entirety herein.

Figure 4A:
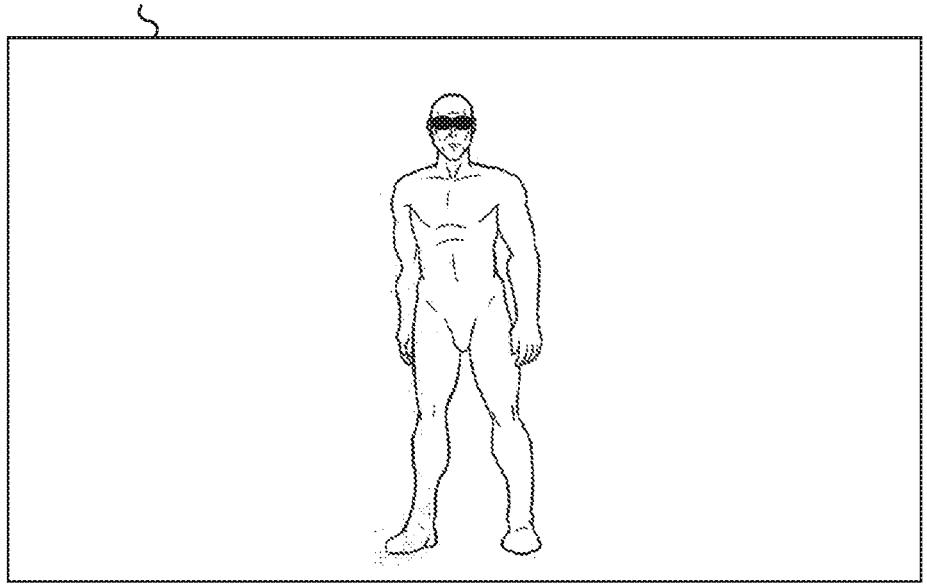
FIG. 4A and FIG. 4B illustrate exemplary displays of an augmented reality environment including virtual content rendered based on a user or living entity, in accordance with one or more implementations.

In some implementations, image generation component 118 may be configured to generate an image of an augmented rendering of a user to be displayed in an augmented reality environment via display device 140. For example, and referring to FIG. 4A, exemplary display 400 of an augmented reality environment is illustrated, in accordance with one or more implementations. Exemplary display 400 may include a view of a user. For example, exemplary display 400 may illustrate a view of a first user via display device 140. In various implementations, content management component 116 may be configured to detect and identify a second user visible within the field of view of a first user. In various implementations, image generation component 118 may be configured to identify and/or detect one or more linkage points of a second user, and a location of each of the one or more linkage points, within the field of view of a first user. For example, exemplary display 400 may comprise one of a series of images depicting a field of view of the first user, and content management component 116 may be configured to detect and identify the second user and multiple linkage points for the second user visible within the field of view of the first user based on the series of images.

In various implementations, content management component 116 may be configured to obtain virtual content information defining virtual content (e.g., an augmented rendering) of the second user based on the identification of the second user. In some implementations, content management component 116 may be configured to determine whether the first user is a subscriber, or otherwise has access, to virtual content of the second user identified within the field of view of the first user and obtain virtual content information defining virtual content of the second user based on a determination that the first user is a subscriber, or otherwise has access, to virtual content of the second user. Based on an identification of the second user, a determination that the first user is a subscriber, or otherwise has access, to virtual content of the second user, and/or obtained virtual content information defining virtual content of the second user, image generation component 118 may be configured to generate an image of virtual content to be displayed in the augmented reality environment.

Figure 4B:
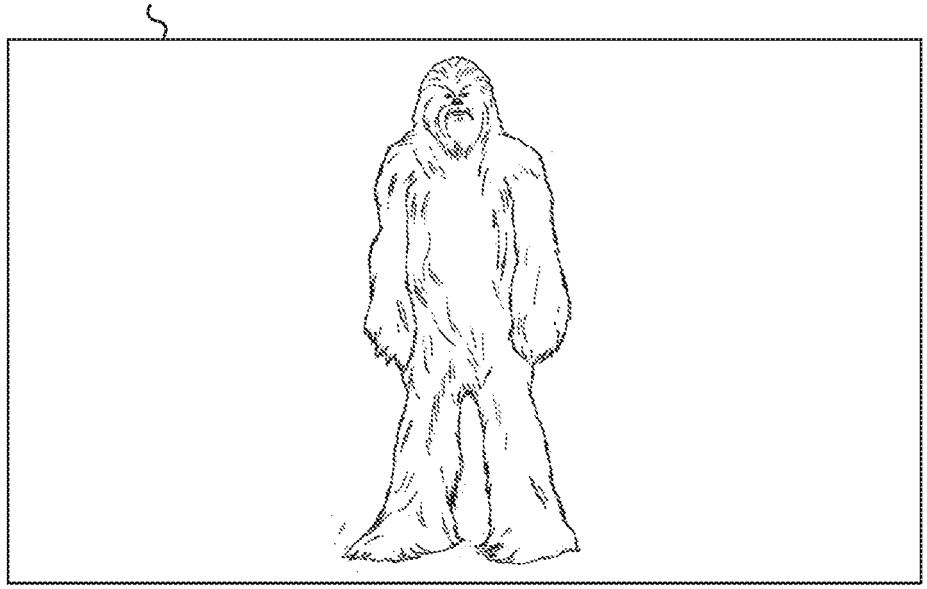

In various implementations, image generation component 118 may be configured to generate an image of virtual content to be displayed in the augmented reality environment based on a correlation between linkage points and the reference frame of the virtual content. For example, and referring to FIG. 4B, exemplary display 402 of an augmented reality environment is illustrated, in accordance with one or more implementations. Exemplary display 402 may include an image of virtual content superimposed over a view of a user in the augmented reality environment. In an exemplary implementation, exemplary display 402 may include an image of virtual content generated by image generation component 118 based on virtual content information defining virtual content (e.g., virtual content generated by content generation component 114) and a correlation between identified linkage points and a reference frame of the virtual content. For example, the correlation between the linkage points and the reference frame of the virtual content may comprise exemplary correlation 300 depicted in FIG. 3. The image of virtual content generated by image generation component 118 may be caused to be rendered in the augmented reality environment via display control component 120.

Exemplary display 400 includes a view of a living entity wearing glasses. The glasses worn by the living entity in exemplary display 400 may or may not be involved in the rendering of virtual content in the augmented reality environment by system 100. In various implementations, the glasses worn by the living entity may be unrelated to the rendering of virtual content by system 100. However, in some implementations, the glasses worn by the living entity may include a transponder and/or comprise a wearable device of the living entity. In some implementations, the glasses worn by the living entity may generate and/or serve as one or more linkage points of the living entity, provide virtual content information, provide triggering information, and/or otherwise interact with system 100 to facilitate the rendering of the virtual content as depicted in the exemplary display 402 of the augmented reality environment.

In various implementations, the techniques described herein may be used to generate and facilitate access to virtual content for multiple users appearing in a field of view of a user simultaneously. In some implementations, content management component 116 may be configured to detect one or more users or other living entities and one or more linkage points for the one or more users or other living entities visible within the field of view of a user. For example, content management component 116 may be configured to detect one or more users or other living entities and one or more linkage points for the one or more users or other living entities visible within the field of view of a user simultaneously. In some implementations, content management component 116 may be configured to determine whether a user is a subscriber, or otherwise has access, to virtual content of multiple other users identified within a field of view of the first user. In some implementations, image generation component 118 may be configured to generate an image of virtual content to be rendered in an augmented reality environment for a specific user when multiple users are detected or identified within the field of view of a user. In some implementations, display control component 120 may be configured to cause an image of virtual content for each of multiple users or living entities to be rendered in an augmented reality environment. For example, display control component 120 may be configured to cause an image of virtual content for each of multiple users or living entities to be rendered in an augmented reality environment simultaneously.

Figure 5A:
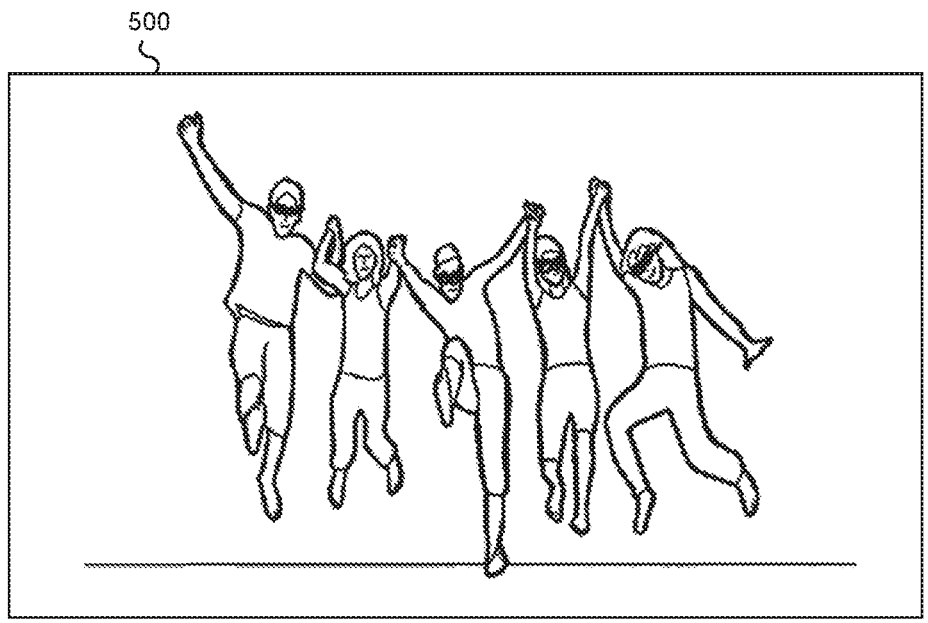
FIG. 5A and FIG. 5B illustrate exemplary displays of an augmented reality environment including virtual content rendered based on multiple users or living entities simultaneously, in accordance with one or more implementations.

For example, and referring to FIG. 5A, exemplary display 500 of an augmented reality environment is illustrated, in accordance with one or more implementations. Exemplary display 500 may include a view of multiple users and/or living entities. For example, exemplary display 500 may illustrate a view of multiple users and/or living entities via display device 140. In various implementations, content management component 116 and/or image generation component 118 may be configured to detect the presence of the multiple users and/or living entities and multiple linkage points for each of the users and/or living entities visible within the field of view of a user. For example, exemplary display 500 may comprise one of a series of images depicting a field of view of the user, and content management component 116 and/or image generation component 118 may be configured to detect the users and/or living entities and multiple linkage points for the users and/or living entities visible within the field of view of a user based on the series of images. Content triggering component 118 may be configured to determine an arrangement of the linkage points detected for the living entities visible within the field of view of a user depicted by exemplary display 500. Based on the detected users and/or living entities, the virtual content information for each of the detected users and/or living entities, and/or the linkage points identified for each of the detected users and/or living entities, image generation component 118 may be configured to generate one or more images of virtual content to be displayed in the augmented reality environment. For example, content management component 116 may be configured to provide instructions to image generation component 118 to generate images of multiple augmented renderings or sets of virtual content to be displayed in the augmented reality environment simultaneously.

Figure 5B:
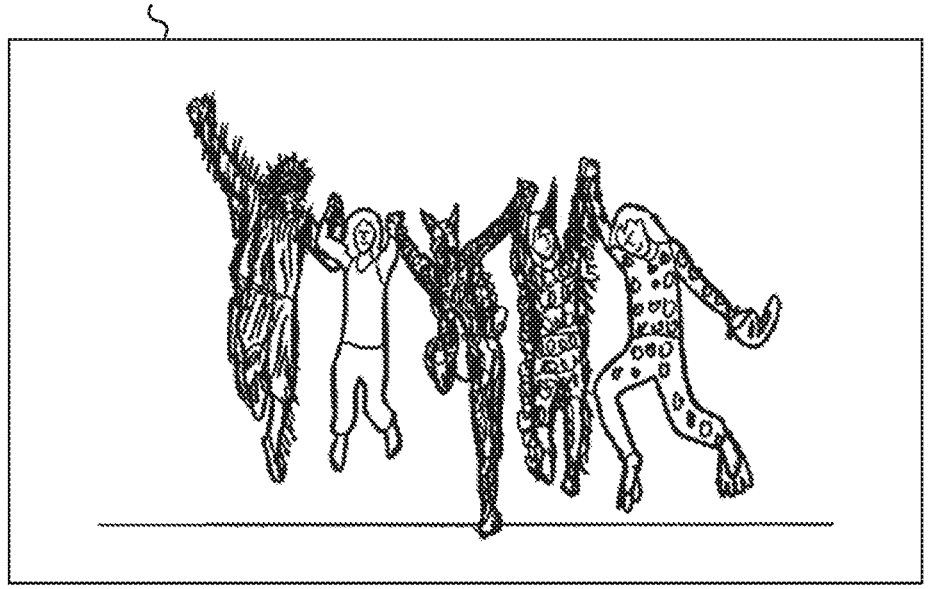

For example, and referring to FIG. 5B, exemplary display 502 of an augmented reality environment is illustrated, in accordance with one or more implementations. Exemplary display 502 may include multiple augmented renderings displayed in the augmented reality environment simultaneously. In an exemplary implementation, exemplary display 502 may include an image of multiple augmented renderings generated by image generation component 118 based on the identification of each user and/or living entity, the virtual content obtained via content management component 116 for each user and/or living entity, and/or the linkage points identified for each user and/or living entity. The virtual content information may define a correlation between linkage points and the reference frame of each augmented rendering used to generate the image of each augmented rendering. The images of the augmented renderings generated by image generation component 118 may be caused to be rendered in the augmented reality environment via display control component 120.

In various implementations, image generation component 118 may be configured to generate a new image of virtual content as a user's field of view changes. For example, display device 140 may move as a user utilizing display device 140 changes position and/or rotates display device 140. As display device 140 moves, image generation component 118 may be configured to automatically generate a new image based on the user's current field of view and virtual content information obtained via content management component 116. Therefore, image generation component 118 may be configured to generate a new image of virtual content based at least on a user's current field of view in real-time. In various implementations, image generation component 118 may be configured to obtain an indication of an updated position of display device 140 in the real world at a second time and generate an updated image of virtual content based on the updated position of the display device 140 at the second time and the user's field of view at the second time. Therefore, image generation component 118 may be configured to generate a first image of virtual content to be displayed at a first time based on the field of view of the user at the first time and generate a second image of virtual content to be displayed at a second time based on the field of view of the user at the second time.

In various implementations, image generation component 118 may be configured to generate a new image of virtual content as a user or living entity moves within a user's field of view. For example, a living entity may move with respect to a user utilizing display device 140 causing the position of the living entity with respect to the user to change, thus, changing the position of the living entity within the user's field of view. As the living entity moves within the user's field of view, image generation component 118 may be configured to automatically generate a new image based on the current position of the living entity within the user's field of view. Therefore, image generation component 118 may be configured to generate a new image of virtual content based at least on the position of the living entity relative to a user's gaze in real-time. As such, the virtual content may be synchronized with the position of the linkage points within the field of view of a viewing user so that the virtual content remains superimposed over the viewed user as the viewed user moves within the field of view of the viewing user.

Movement by a user or living entity within a field of view of a user that may prompt image generation component 118 to generate a new image of the augmented rendering of the user may comprise the smallest gesture or facial expression. As such, the augmented rendering of a user may appear as the user would appear in the real-world if the augmented rendering was real.

In various implementations, image generation component 118 may be configured to generate images of virtual content to be displayed in the augmented reality environment using some or all of the techniques described herein. In some implementations, image generation component 118 may be configured to generate images of virtual content to be displayed in the augmented reality environment using some or all of the techniques described herein and/or one or more techniques described in co-pending U.S. patent application Ser. No. 15/893,498, entitled "SYSTEMS AND METHODS FOR UTILIZING A LIVING ENTITY AS A MARKER FOR AUGMENTED REALITY CONTENT," the disclosure of which is hereby incorporated by reference in its entirety herein.

Display control component 120 may be configured to cause an image of virtual content to be displayed in an augmented reality environment via display device 140. In various implementations, display control component 120 may be configured to effectuate transmission of instructions to display device 140. Images of virtual content generated by image generation component may be presented via a display device in conjunction with the real world so that the virtual content appears as if it exists in the real world.

In various implementations, display control component 120 may be configured to generate and/or obtain instructions causing an image of virtual content to be displayed via display device 140. In some implementations, display control component 120 may be configured to cause updated images of virtual content to be displayed in the augmented reality environment via a display device in real-time. In some implementations, display control component 120 may be configured to cause images of multiple virtual content items or multiple sets of virtual content to be displayed in an augmented reality environment simultaneously via display device 140.

Figure 6A:
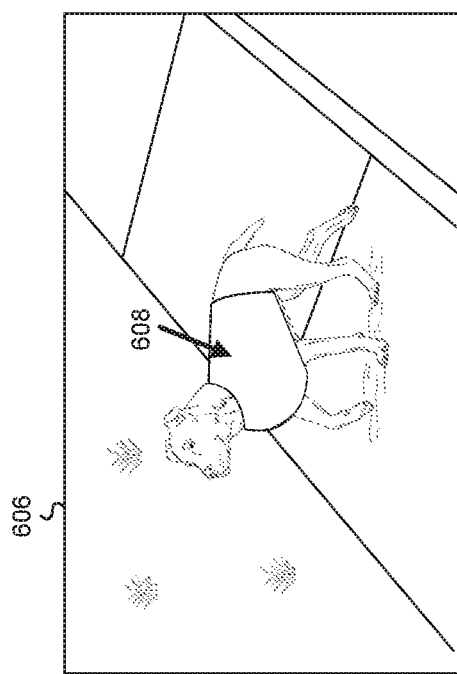
FIG. 6A, FIG. 6B, and FIG. 6C illustrate exemplary displays of an augmented reality environment including virtual content rendered based on a non-human user or living entity, in accordance with one or more implementations.
Figure 6B:
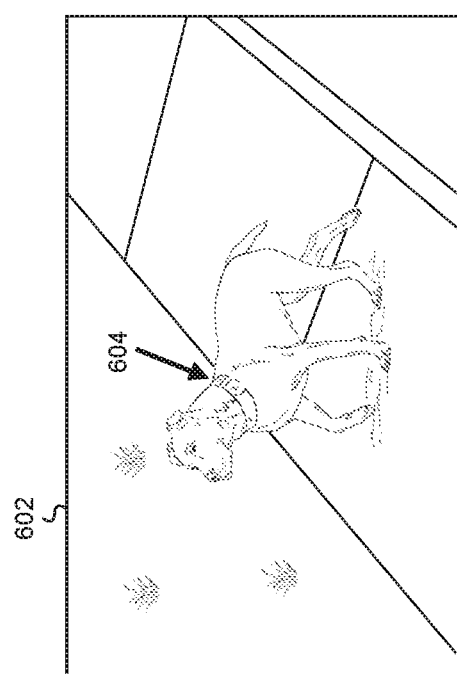
Figure 6C:
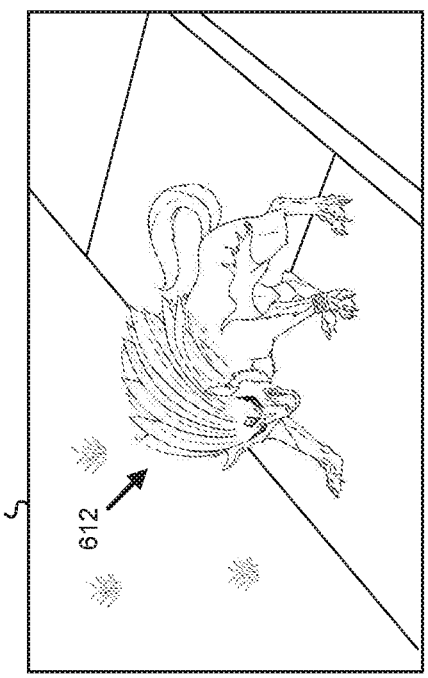

In various implementations, display control component 120 may cause image generation component 118 to generate and render an image of virtual content in an augmented reality environment based on a non-human user or living entity. For example, FIG. 6A, FIG. 6B, and FIG. 6C illustrate exemplary displays of an augmented reality environment including virtual content rendered based on a non-human living entity, in accordance with one or more implementations. Exemplary display 602 depicts a view of a non-human living entity—i.e., a dog. The presence of the dog in the field of a view of a user may be detected by content management component 116 using one or more of the techniques described herein. For example, content management component 116 may be configured to detect the presence of the dog within the field of view of the user based on transponder 604 of the living entity. In exemplary display 602, transponder 604 may be located on or within a dog collar or other wearable device of the dog. Referring to FIG. 6B, exemplary display 606 depicts a view of the same non-human living entity (i.e., the same dog) wearable item 608 may be used to detect the presence of the dog within the field of view of the user. For example, wearable item 608 may comprise a vest and/or other pet accessory worn by the dog to facilitate the rendering of virtual content based on the dog in the augmented reality environment. In some implementations, wearable item 608 may comprise a set of linkage points that may serve as an anchor for virtual content in the augmented reality environment. For example, each of the set of linkage points of wearable item 608 may be predefined and correlated with virtual content to be presented based on the dog. In other words, each of the linkage points may be predefined to represent points on the dog that may be correlated with points of the virtual content. In some implementations, wearable item 608 may include a transponder. Transponder 604 and/or a transponder of wearable item 608 may be configured to provide at least one linkage point of the living entity (i.e., the dog). The at least one linkage point may be predefined so as to be associated with a specific linkage point with respect to a correlation of the linkage points and the arrangement of linkage points. For example, the at least one linkage point defined based on transponder 604 and/or a transponder of wearable item 608 may be predefined as a linkage point identifying the neck or middle of back of the dog. Based on the at least one linkage point, content management component 116 may be configured to detect and/or identify one or more additional linkage points. For example, content management component 116 may be configured to identify one or more additional linkage points using one or more image recognition techniques, object recognition techniques, and/or body recognition techniques. Referring to FIG. 6C, exemplary display 610 of an augmented reality environment is illustrated, in accordance with one or more implementations. Exemplary display 610 may include virtual content item 612. Virtual content item 612 may be predefined virtual content (e.g., an augmented rendering) associated with the dog. In some implementations, an owner of the dog may select virtual content item 612 as the virtual content to be rendered when the dog is visible within the field of view of a user. In some implementations, an augmented rendering (or three-dimensional representation) of the dog may be generated and modified using one or more techniques described herein with respect to content generation component 114. As the dog moves within the field of view of a user (either due to movement by the dog and/or movement by the user with respect to the dog), an updated image of virtual content item 612 may be rendered in the augmented reality environment. As such, the virtual content item 612 may be synchronized with the position of the linkage points within the field of view of the user so that virtual content item 612 remains superimposed over the dog as the dog moves within the field of view of the user.

In some implementations, a controlling user may control the augmented rendering that is displayed based on one or more other users and/or living entities. For example, a single user may control which aspects of an augmented rendering or which augmented renderings are depicted based on another user and/or living entity. In an exemplary implementation, a parent may utilize one or more parental controls to dictate which aspects of an augmented rendering or which augmented renderings of their child may be depicted based on their child, or seen depicted on their child by one or more other users. In other words, a parent may dictate how their child is seen by other users. In exemplary implementations where the viewed user or living entity is a dog or other non-human living entity, an owner, trainer, or supervisor may dictate which aspects of an augmented rendering or which augmented renderings of the non-human living entity may be depicted based on the non-human living entity, or seen depicted on the non-human living entity by one or more other users. In other words, an owner of a pet may dictate how their pet is seen by other users. For example, in exemplary display 610 depicted in FIG. 6C, an owner of the non-human living entity (i.e., the dog) may dictate or control which aspects of an augmented rendering or which augmented renderings may be seen based on the non-human living entity. In other words, an owner of the dog seen in exemplary display 610 may dictate or determine the content that is depicted in exemplary display 610 (i.e., virtual content item 612).

In various implementations, system 100 may be configured to facilitate remote interaction with virtual content depicted in the augmented reality environment by one or more other users. In some implementations, computer readable instructions 112 may include a remote interaction component. The remote interaction component may be configured to facilitate numerous types of remote interaction with virtual content. For example, to facilitate remote interaction with virtual content, system 100 may further comprise a content management component and/or remote interaction component as described in co-pending U.S. patent application Ser. No. 15/796,716, entitled "SYSTEMS AND METHODS FOR RENDERING A VIRTUAL CONTENT OBJECT IN AN AUGMENTED REALITY ENVIRONMENT," the disclosure of which is hereby incorporated by reference in its entirety herein.

In some implementations, the remote interaction component may be configured to facilitate the broadcast of a visualization of an augmented reality environment by a user via a display device to one or more other users viewing the broadcast via one or more other display devices. For example, a recording of images rendered in an augmented reality environment via a display device may be transmitted to one or more user devices associated with other users. In some implementations, the remote interaction component may be configured to facilitate a live stream of an augmented reality environment viewed via a display device to one or more other user devices. As such, a remote user may be able to view an augmented reality environment another user is viewing via display device in real-time. In some implementations, a display device recording images rendered in an augmented reality environment, or a device communicatively coupled to the display device, may have access to virtual content information for one or more users visible by the display device. As such, the display device may cause augmented renderings of one or more users visible within a field of view of the display device to be depicted in association with the one or more users. In some implementations, the display device may include, or be communicatively coupled to, one or more 360 degree cameras used to capture images used to facilitate generation of an virtual reality environment. The images captured by the 360 degree camera may be used to generate a virtual reality environment in which augmented renderings of one or more users within a field of view of the camera are depicted based on the one or more users, wherein one or more remote users may utilize virtual reality technology to visualize a virtual reality environment in which the users are seen as their augmented renderings.

In some implementations, the remote interaction component may be configured to facilitate the display of an augmented rendering of a remote user in an augmented reality environment viewed by a viewing user. For example, a viewing user (or a device of a viewing user) may communicate with a remote user (or a device of a remote user) in order to request access to virtual content information for the remote user. When access is facilitated (e.g., in response to the request), the remote interaction component may be configured to cause virtual content information of the remote user to be provided to image generation component 118. When an augmented rendering of a remote user is depicted in an augmented reality environment of a viewing user, the augmented rendering may be depicted based on a viewed user visible within the field of view of the viewing user, based on the remote user, and/or based on a predefined (or preprogrammed) animation or orientation.

In various implementations, image generation component 118 may be configured to generate an image of the augmented rendering of the remote user to be displayed in the augmented reality environment of the viewing user by display control component 120. In some implementations, the augmented rendering of the remote user may be displayed in the augmented reality environment viewed by the viewing user (who is remote from the remote user) based on a viewed user within the field of view of the viewing user. For example, one or more linkage points for another user visible within a field of view of the viewing user may be identified. Based on the identified one or more linkage of the viewed user, image generation component 118 may be configured to generate an image of the augmented rendering of the remote user to be displayed in the augmented reality environment of the viewing user by display control component 120. As the viewed user moves, the augmented rendering of the remote user may appear based on the viewed user. In other words, the augmented rendering of the remote user may be synchronized with the position of the linkage points of the viewed user within the field of view of a viewing user so that the augmented rendering of the remote user remains superimposed over the viewed user as the viewed user moves within the field of view of the viewing user.

In some implementations, the augmented rendering of the remote user may be displayed in the augmented reality environment viewed by the viewing user (who is remote from the remote user) based on the remote user. For example, one or more imaging devices at a location of the remote user may capture an image and/or movement of the remote user. In some implementations, one or more linkage points of the remote user may be identified and utilized to determine the orientation and/or movement of the remote user. The image generation component 118 may be configured generate an image of the augmented rendering of the remote user to be displayed in the augmented reality environment viewed by a viewing user (that is remote from the remote user) based on images, the orientation, and the movement of the remote user. As such, the augmented rendering of the remote user may comprise, and be depicted as, an avatar of the remote user within the augmented reality environment of the viewing user.

In some implementations, the augmented rendering of the remote user may be displayed in the augmented reality environment viewed by the viewing user (who is remote from the remote user) based on a predefined (or preprogrammed) animation or orientation. For example, a viewing user may select an animation and/or orientation in which the viewing user wishes to see an augmented rendering of a remote user within the augmented reality environment of the viewing user. In some implementations, a remote user may indicate one or more animations and/or orientations in which the remote user wishes to see an augmented rendering of a remote user within the augmented reality environment of the viewing user. As such, a viewing user's choices between animations and/or orientations in which to visualize an augmented rendering of a remote user may be limited to the one or more animations and/or orientations chosen by the remote user. In some implementations, a viewing user may indicate where within an augmented reality environment (or where within their field of view) they wish to visualize an augmented rendering of a remote user. Based on an indication provided by the viewing user of a location within the augmented reality environment in which they wish to visualize an augmented rendering of a remote user, image generation component 118 may be configured to generate an image of the augmented rendering of the remote user to be displayed in the augmented reality environment of the viewing user by display control component 120.

In some implementations, the remote interaction component may be configured to facilitate the broadcast of a visualization of an augmented reality environment by a user via a display device to one or more other users viewing the broadcast via one or more other display devices. For example, a recording of images rendered in an augmented reality environment via a display device may be transmitted to one or more user devices associated with other users. In some implementations, the remote interaction component may be configured to facilitate a live stream of an augmented reality environment viewed via a display device to one or more other user devices. As such, a remote user may be able to view an augmented reality environment another user is viewing via display device in real-time.

In an exemplary implementation, two users may request to view a live stream as seen from the display device of the other. As such, two users may simultaneously view the other's feed. Doing so would enable two users to view an augmented rendering of themselves as seen from the display device of another. For example, a first user may send a request to view a live stream from the display device of a second user. If the second user accepts the request, the first user and the second user may simultaneously view the augmented reality environment seen through the display device of the second user. While doing so, the second user may send a request to view a live stream from the display device of the first user. If the first user accepts the request, the second user may view the augmented reality environment seen through the display device of the first user while the first user simultaneously views the augmented reality environment seen through the display device of the second user.

User interface component 122 may be configured to generate and cause a user interface to be displayed to a user. In various implementations, the user interface may be displayed to a user via a display interface of a user device. For example, a user interface may be displayed to a user via a graphical user interface of a user device, a display of display device 140, or any other display interface provided via a user device and/or a component of system 100.

In various implementations, user interface component 122 may be configured to generate a user interface that provides a user with information related to system 100. For example, the information related to the system may comprise an indication of one or more connected devices (e.g., a user device such as a smartphone or display device, and/or other devices connectable to system 100), virtual content depicted in the augmented reality environment whether currently visible or not, virtual content available to be presented via display device 140 (e.g., content available via one or more devices of a user, electronic storage 130, and/or other components of system 100), an indication of a direction in which virtual content may be visible via display device 140 (e.g., one or more arrows depicted a direction to move the display device to visualize virtual content), an indication of one or more markers or linkage points visible via display device 140, an indication of one or more users, living entities, and/or recognizable objects visible via display device 140, one or more instructions for the user to trigger the rendering of virtual content in the augmented reality environment via display device 140, an indication of one or more other users interacting with and/or viewing virtual content, a current time and/or date, and/or other information related to system 100. In some implementations, user interface component 122 may be configured to generate a user interface that provides a user with information related to system 100 without enabling the user to provide input via the user interface.

In various implementations, user interface component 122 may be configured to generate a user interface that provides a user with information related to system 100 and enables a user to provide input. For example, the user interface may comprise selectable icons, input fields, and/or other user input options enabling a user to control one or more aspects of system 100. In some implementations, user interface component 122 may be configured to generate a user interface that enables a user to request virtual content to be rendered in the augmented reality environment. In some implementations, user interface component 122 may be configured to generate a user interface that enables a user to modify virtual content information for virtual content based on one or more types of user input. For example, a user interface generated by user interface component 122 may be configured to receive requests to modify virtual content displayed via display device 140. Requests to modify virtual content may comprise requests to modify (i.e., alter) virtual content currently displayed via display device 140 and/or requests to swap out the virtual content rendered in an augmented reality environment for other virtual content. In some implementations, user interface component 122 may be configured to generate and provide to a user an interface that may receive requests to render virtual content and/or modify virtual content while virtual content is simultaneously rendered in the augmented reality environment via display device 140. In some implementations, user interface component 122 may be configured to generate a user interface that enables a user to request the removal of virtual content rendered in the augmented reality environment.

In various implementations, user interface component 122 may be configured to generate a user interface that provides an indication of the virtual content available to be presented via display device 140. Virtual content may comprise one or more virtual content items able to depicted in an augmented reality environment based on one or more reference frames. As used herein, the term "augmented reality environment" may refer to a simulated environment that includes the visual synthesis and/or combination of both (i) visible physical objects and/or physical surroundings, and (ii) visual virtual content presented in conjunction with the visible physical objects and/or physical surroundings to visually augment the visible physical objects and/or physical surroundings. The visual virtual content to be presented within a given physical environment (e.g., the visible physical objects and/or physical surroundings at a given location) may be referred to as a "virtual environment". In some implementations, virtual content may be superimposed over a physical object (or objects) to replace such physical object(s) in the augmented environment. Descriptions herein (such as the forgoing) describing visual augmentation of a physical environment within an augmented reality environment should not be read as precluding other forms of augmentation (e.g., audio, haptic, etc.).

Virtual content may refer to one or more virtual content items. Each virtual content item may be associated with one or more specific users, living entities, structures, or objects visible within a field of view of a user. A virtual content item may comprise visual or non-visual virtual content to be perceived in an augmented reality environment. For example, a virtual content item may comprise a two- or three-dimensional virtual image or depiction of an object, a part of an object, a surface, a texture, an effect or animation, information, and/or other content visibly manifested in views of the augmented reality environment. In some implementations, virtual content may comprise an augmented rendering of a user or other living entity. An augmented rendering of a user or other living entity may comprise a full- or partial-body virtual content object depicted based on that user or living entity, or one or more other users or living entities.

In some implementations, virtual content depicted in the augmented reality environment may comprise a set of virtual content. A set of virtual content is one or more virtual content items that share a reference frame. That is, the position, orientation, scale, and/or other parameters of the virtual content item or items in the set of virtual content can be manipulated in a coordinated way by manipulating the reference frame for the set of virtual content.

The virtual content available to be presented via display device 140 may include virtual content stored on or accessible via one or more devices of a user, electronic storage 130, and/or other components of system 100. In some implementations, user interface component 122 may be configured to provide a list of virtual content available to be presented via display device 140 obtained from content management component 116. For example, user interface component 122 may be configured to cause a selectable list of virtual content available to be presented via display device 140 to be provided to a user. The list of virtual content available to be presented via display device 140 may include virtual content stored on or accessible via one or more devices of a user, electronic storage 130, other components of system 100, virtual content available via one or more connected devices (e.g., a device of a living entity visible within a field of view of the user), and/or virtual content available via a network (e.g., obtainable via the Internet, stored in cloud storage, or otherwise available via a network). In some implementations, the list of virtual content may include an indication of one or more particular users that must be identified before one or more of the list of virtual content may be displayed and/or upon which the virtual content must be rendered. In some implementations, the list of virtual content may include an indication of a state or action of a living entity that must be identified to trigger the rendering of virtual content associated with the state or action.

In some implementations, user interface component 122 may be configured to cause a selectable list of virtual content to be provided to a user via a user interface. In some implementations, the list of virtual content may contain multiple virtual content items that are unique to a given user. For example, a single user may be associated with multiple augmented renderings of the user. When a viewed user is identified within a field of view of a user, the user may select an augmented rendering to display in association with the viewed user in the augmented reality environment. For example, the user may select one of the augmented renderings of the user to display in association with the viewed user in the augmented reality environment. In some implementations, user interface component 122 may be configured to receive a selection indicating virtual content to be presented via display device 140. For example, user interface component 122 may be configured to receive user input indicating a selection of one or more virtual content items to be presented via display device 140.

In some implementations, a viewed user visible within a field of view of a viewing user may be provided with a user interface that includes a selectable list of virtual content to be displayed in association with the viewed user. For example, once a viewed user is identified within a field of a view of a viewing user, system 100 may cause an indication that the viewed user has been identified to be provided to a device of the viewed user. In response to the indication that the viewed user has been identified, the device of the viewed user may cause a user interface to be provided that includes a list of virtual content to be presented in association with the viewed user. For example, the list of virtual content may comprise multiple augmented renderings of the viewed user. In some implementations, the indication may comprise a message with a prompt to select an augmented rendering from the list of augmented renderings of the viewed user. Via the device of the viewed user, the viewed user may select virtual content (e.g., a particular augmented rendering) to appear in association with the viewed user via display device 140. As such, the viewed user may decide, for each viewing user that is looking at them, how they are seen. In other words, each user may determine how they are seen by each other user. In the foregoing implementation, content management component 116 may be configured to obtain virtual content information defining the specific virtual content selected by the viewed user to be displayed via display device 140 in association with the viewed user.

In some implementations, user interface component 122 may be configured to generate a user interface that provides one or more selectable controls associated with recording, broadcasting, live streaming, and/or otherwise providing an image of an augmented reality environment to one or more other users. For example, the one or more selectable controls may enable a user to pause, stop, fast forward, rewind, and/or otherwise control a recording. In some implementations, the one or more selectable controls may enable a user to identify one or more recipients of an image of an augmented reality environment and/or establish one or more access controls associated with the image of the augmented reality environment.

Electronic storage 130 may include electronic storage media that electronically stores information. The electronic storage media of electronic storage 130 may be provided integrally (i.e., substantially non-removable) with one or more components of system 100 and/or removable storage that is connectable to one or more components of system 100 via, for example, a port (e.g., a USB port, a Firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 130 may be a separate component within system 100, or electronic storage 130 may be provided integrally with one or more other components of system 100 (e.g., a user device, processor 110, or display device 140). Although electronic storage 130 is shown in FIG. 1 as a single entity, this is for illustrative purposes only. In some implementations, electronic storage 130 may comprise multiple storage units. These storage units may be physically located within the same device, or electronic storage 130 may represent storage functionality of multiple devices operating in coordination.

Electronic storage 130 may store software algorithms, information determined by processor 110, information received remotely, and/or other information that enables system 100 to function properly. For example, electronic storage 130 may store virtual content information, an indication of virtual content stored and/or accessible by the system, images generated by image generation component 118, sensor information (e.g., orientation information), device information, location information, and/or other information. In some implementations, electronic storage 130 may store database comprising one three-dimensional representations of one or more users, templates and/or instructions used to programmatically modify three-dimensional representations, virtual content information, user preferences, subscription information for one or more users, permission information for virtual content, and/or other information obtained, generated, and/or utilized by system 100.

Display device 140 may be configured to present virtual content in an augmented reality environment. In various implementations, display device 140 may be configured to generate light and provide the light to an eye of a user such that the light forms images of the virtual content configured to be perceived in the augmented reality environment as if it were present in the real world. Display device 140 may include one or more of a display, one or more sensors, and/or other components. Presentation of virtual content via a display of display device 140 may be facilitated by control signals communicated to display device 140. For example, display control component 120 may be configured to communicate one or more control signals to display device 140. In some implementations, display device 140 may be configured to present content individually to each eye of a user as stereoscopic pairs.

Display device 140 may comprise any device capable of displaying a real-time view of a physical, real-world environment while superimposing images of virtual content over the real-time view of the physical, real-world environment. As such, display device 140 may comprise any device that includes and/or is communicatively coupled to an image capturing device (e.g., a camera and/or any other device that includes an imaging sensor) that may be used to capture a view of the real-world environment. For example, display device 140 may comprise and/or be communicatively coupled to a depth camera, a stereoscopic camera, and/or one or more other cameras that may be used to capture one or more images of a user or a physical environment.

In various implementations, display device 140 may comprise a smartphone, a tablet, a computer, a wearable device (e.g., a headset, a visor, glasses, contact lenses, and/or any other wearable device), a monitor, a projector, and/or any other device configured to present views of virtual content in an augmented reality environment. In various implementations, display device 140 may include or be associated with one or more speakers for playing one or more sounds associated with a virtual content object. In some implementations, display device 140 may be arranged on, and/or may comprise part of, a headset (not shown in FIG. 1). When headset is installed on a user's head, the user's gaze may be directed towards display device 140 (or at least a display of display device 140) to view content presented by display device 140.

A display of display device 140 may include one or more of screen, a set of screens, a touchscreen, a monitor, a headset (e.g., a head-mounted display, glasses, goggles), contact lenses, and/or other displays. In some implementations, a display may include one or more of a transparent, semi-transparent, reflective, and/or semi-reflective display component, such as a visor, glasses, and/or contact lenses. Images of virtual content may be presented on the display component such that the user may view the images presented on the display component as well as the real-world through the display component. The virtual content may be perceived as being present in the real world. Such a configuration may provide an interactive space comprising an augmented reality environment. By way of non-limiting illustration, display device 140 may comprise an AR headset.

Individual sensors of display device 140 may be configured to generate output signals. An individual sensor may include an orientation sensor, and/or other sensors (e.g., imaging sensor 150). An orientation sensor of display device 140 may be configured to generate output signals conveying orientation information and/or other information. Orientation information derived from output signals of an orientation sensor may define an orientation of display device 140. In some implementations, orientation of display device 140 may refer to one or more of a pitch angle, a roll angle, a yaw angle, and/or other measurements. An orientation sensor may include an inertial measurement unit (IMU) such as one or more of an accelerometer, a gyroscope, a magnetometer, Inclinometers, and/or other devices. In various implementations, the orientation of display device 140 may be communicated to image generation component 118 to generate and/or update images of a virtual content object to be viewed via display device 140. Imaging sensor 150 may be configured to generate output signals conveying a series of images depicting a field of view of the user. In various implementations, imaging sensor 150 may be physically located within display device 140, physically located separate from display device 140, and/or within any of the other components of system 150. For example, imaging sensor 150 may be physically located within a depth sensing camera communicatively coupled to display device 140 and/or one or more other components of system 100.

System 100 may include one or more devices configured to or capable of providing haptic features via tactile output. For example, a user device, display device 140, and/or one or more other components of system 100 may be configured to vibrate based on one or more parameters defining haptic features of virtual content. A haptic feature may comprise one or more effects associated with virtual content observed haptically. For example, effects observed haptically may comprise one or more of a vibration, a motion, a temperature, and/or other haptic effects observed via tactile output. Haptic features may be static or dynamic, and may be haptically observed at a time, over a period of time, at a location, and/or over a range of locations. Virtual content information defining virtual content may define one or more triggers associated with one or more haptic features of the virtual content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 110, electronic storage 130, display device 140, and imaging sensor 150 are shown to be connected to interface 102 in FIG. 1, any communication medium may be used to facilitate interaction between any components of system 100. One or more components of system 100 may communicate with each other through hard-wired communication, wireless communication, or both. For example, one or more components of system 100 may communicate with each other through a network. For example, processor 110 may wirelessly communicate with electronic storage 130. By way of non-limiting example, wireless communication may include one or more of the Internet, radio communication, Bluetooth communication, Bluetooth Low Energy (BLE) communication, Wi-Fi communication, cellular communication, infrared communication, or other wireless communication. Other types of communications are contemplated by the present disclosure.

Although processor 110 is illustrated in FIG. 1 as a single component, this is for illustrative purposes only. In some implementations, processor 110 may comprise multiple processing units. These processing units may be physically located within the same device, or processor 110 may represent processing functionality of multiple devices operating in coordination. For example, processor 110 may be located within a user device, display device 140, and/or other components of system 100. In some implementations, processor 110 may be remote from a user device, display device 140, and/or other components of system 100. Processor 110 may be configured to execute one or more components by software; hardware; firmware; some combination of software, hardware, and/or firmware; and/or other mechanisms for configuring processing capabilities on processor 110.

Furthermore, it should be appreciated that although the various instructions are illustrated in FIG. 1 as being co-located within a single processing unit, in implementations in processor(s) 110 include multiple processing units, one or more instructions may be executed remotely from the other instructions.

The description of the functionality provided by the different computer-readable instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 110 may be programmed by one or more additional instructions that may perform some or all of the functionality attributed herein to one of the computer-readable instructions.

Exemplary Flowcharts of Processes

Figure 7:
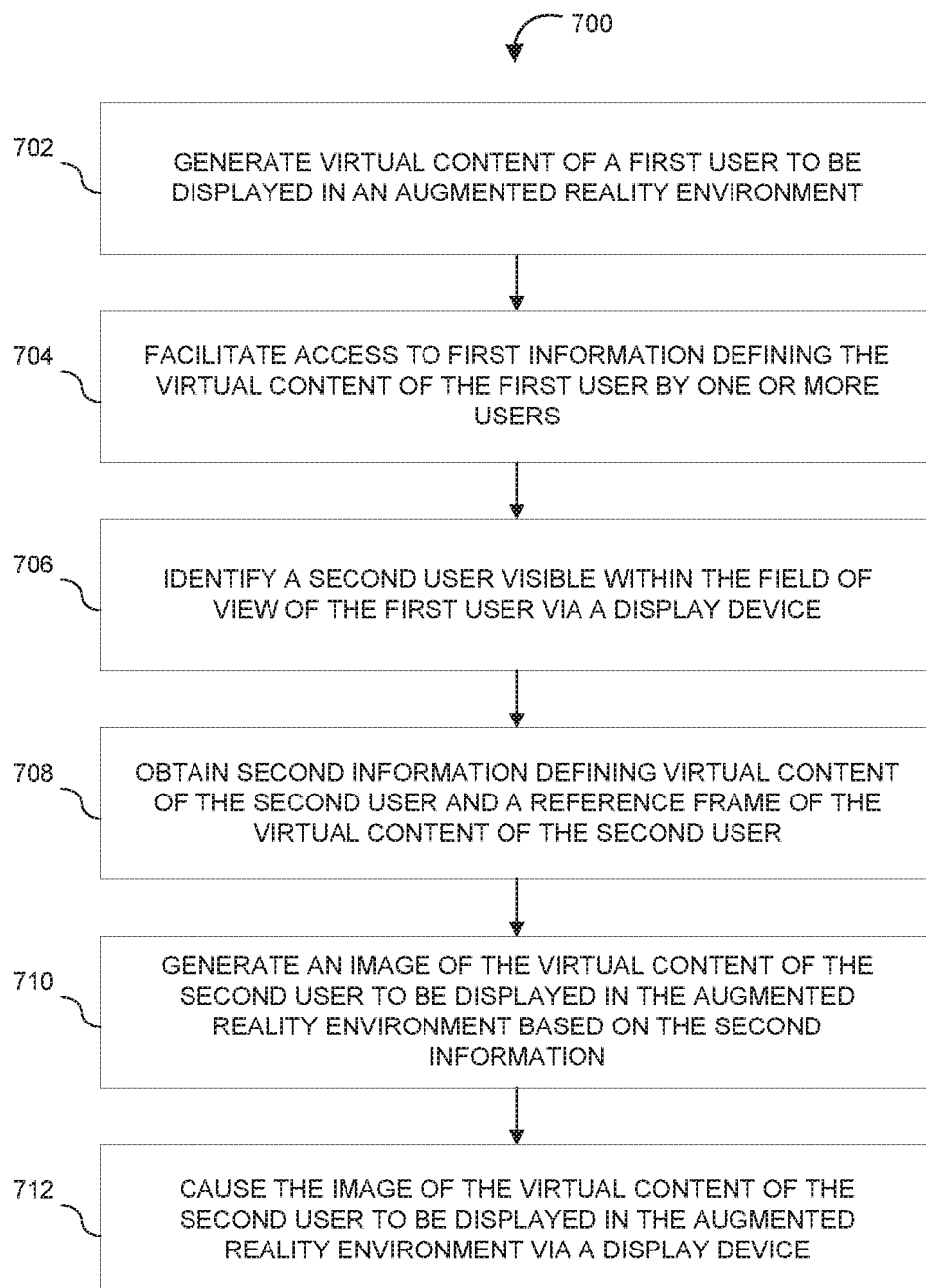
FIG. 7 illustrates a method for generating and facilitating access to virtual content to be presented in an augmented reality environment, in accordance with one or more implementations.

FIG. 7 illustrates a method 700 for generating and facilitating access to virtual content to be presented in an augmented reality environment, in accordance with one or more implementations. The operations of method 700 presented below are intended to be illustrative and, as such, should not be viewed as limiting. In some implementations, method 700 may be accomplished with one or more additional operations not described, and/or without one or more of the operations discussed. In some implementations, two or more of the operations may occur substantially simultaneously. The described operations may be accomplished using some or all of the system components described in detail above.

In some implementations, method 700 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 700 in response to instructions stored electronically on one or more electronic storage mediums. The one or more processing devices may include one or more devices configured through hardware, firmware, and/or software to be specifically designed for execution of one or more of the operations of method 700.

In an operation 702, method 700 may include generating virtual content of a first user to be displayed in an augmented reality environment. For example, the virtual content of the first user may comprise an augmented rendering of the first user. In various implementations, one or more images of a user may be obtained and utilized to generate a three-dimensional representation of the user. The three-dimensional representation may be modified and stored in order to later serve as the augmented rendering of the user. For example, a user may modify a three-dimensional representation of a user via user input indicating a request to modify one or more parameters that define the appearance, movements, animation, tactile feedback, and/or other aspects of the three-dimensional representation. In some implementations, operation 702 may be performed by a processor component the same as or similar to content generation component 114 (shown in FIG. 1 and described herein).

In an operation 704, method 700 may include facilitating access to first information defining the virtual content of the first user by one or more users. Facilitating access to the virtual content information may comprise transmitting the virtual content information to one or more devices of other users. In some implementations, access to the virtual content information may be provided to one or more third parties. One or more third parties may provide services enabling users to utilize virtual content outside an augmented reality environment. In some implementations, operation 704 may be performed by a processor component the same as or similar to content management component 116 (shown in FIG. 1 and described herein).

In an operation 706, method 700 may include identifying a second user visible within the field of view of the first user via a display device. A user or other living entity may be identified within a field of view of a user using facial recognition or body recognition, by recognizing a transponder associated with one or more specific users, by recognizing a user device associated with one or more specific users, based on audio information associated with one or more specific users, by recognizing one or more specific users within the field of view of the user associated with one or more specific users, and/or using one or more other recognition techniques. In some implementations, operation 706 may be performed by a processor component the same as or similar to content management component 116 (shown in FIG. 1 and described herein).

In an operation 708, method 700 may include obtaining second information defining virtual content of the second user and a reference frame of the virtual content of the second user. In various implementations, information defining virtual content related to the second user may be obtained responsive to the identification of the second user within the field of view of the first user. Each user, specific living entity, type of living entity, and/or group of living entities may be associated with specific virtual content. The information obtained may define the virtual content item to be displayed when the identified user is present within the field of view of the user. In some implementations, operation 708 may be performed by a processor component the same as or similar to content management component 116 (shown in FIG. 1 and described herein).

In an operation 710, method 700 may include generating an image of the virtual content of the second user to be displayed in the augmented reality environment based on the second information. In various implementations, the image may be generated based at least on a user's field of view and information defining at least the virtual content and a reference frame of the virtual content (i.e., the second information). A user's field of view may be defined based on orientation information, location information, and/or other information. In some implementations, operation 710 may be performed by a processor component the same as or similar to image generation component 118 (shown in FIG. 1 and described herein).

In an operation 712, method 700 may include causing the image of the virtual content of the second user to be displayed in the augmented reality environment via a display device. In various implementations, one or more instructions may be transmitted to the display device to cause the image of virtual content to be displayed. Images of virtual content generated by image generation component may be presented via a display device in conjunction with the real world so that the virtual content appears as if it exists in the real world. In some implementations, updated images of virtual content may be displayed in the augmented reality environment via a display device in real-time. In some implementations, operation 712 may be performed by a processor component the same as or similar to display control component 120 (shown in FIG. 1 and described herein).

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to generate and facilitate access to a personalized augmented rendering of a user visible in an augmented reality environment, the system comprising:
   a presentation device configured to convey images of virtual content to a first user such that the images of virtual content are perceived by the first user in the augmented reality environment as if it were present in a real world; and
   one or more physical computer processors configured by computer-readable instructions to:
      generate an augmented rendering of the first user to be presented in the augmented reality environment by:
         obtaining one or more images of the first user; and
         generating a three-dimensional representation of the first user based on the one or more images of the first user;
      obtain user input from the first user indicating a request to modify the three-dimensional representation of the first user, wherein the request to modify the three-dimensional representation of the first user comprises a request to modify one or more parameters of the three-dimensional representation of the first user, wherein the one or more parameters define the three-dimensional representation of the first user;

facilitate access to first information defining the augmented rendering of the first user by one or more other users, wherein facilitating access includes generating an image of the augmented rendering of the first user to be presented in one or more augmented reality environments via one or more other presentation devices of at least the one or more other users based on the first information, a field of view of the one or more other users, a position of the one or more other presentation devices in the real world, and a position associated with the first user in the real world;

cause the first information defining the augmented rendering of the first user to be stored;

identify the one or more other users visible within a field of view of the first user via the presentation device;

responsive to the identification of the one or more other users within the field of view of the first user, obtain one or more other information defining individual augmented renderings of the one or more other users and a position of the one or more other users in the real world;

generate individual images of the individual augmented renderings of the one or more other users to be presented in the augmented reality environment, wherein the images of the individual augmented renderings of the one or more other users are generated based on the one or more other information, the field of view of the first user, and a position of the presentation device in the real world; and cause the individual images of the individual augmented renderings of the one or more other users to be presented in the augmented reality environment via the presentation device.

2. The system of claim 1, wherein the one or more physical computer processors are further configured to:
obtain one or more subscription information for the one or more other users, wherein the one or more subscription information for the one or more other users indicate one or more subscriptions of the one or more other users; and determine that at least one of the one or more subscriptions of the one or more other users permit access to the augmented rendering of the first user, wherein the facilitation of access to the first information by the one or more other users is responsive to the determination that at least one of the one or more subscriptions of the one or more other users permits access to the augmented rendering of the first user.

3. The system of claim 2, wherein to facilitate access to the first information, the one or more physical computer processors are further configured to:
cause the first information to be transmitted to the one or more other presentation devices of the one or more other users.

4. The system of claim 1, wherein the one or more parameters define the apparent height, apparent weight, apparent muscle tone, apparent skin tone, appearance of one or more specific body parts, and/or appearance of one or more wrinkles depicted by the three-dimensional representation of the first user.

5. The system of claim 1, wherein the user input comprises physical input received via a user device, voice input, gesture-based input, input based on movement of the presentation device, or input based on user eye movement.

6. A system configured to generate and facilitate access to a personalized augmented rendering of a user visible in an augmented reality environment, the system comprising:
a presentation device configured to convey images of virtual content to a first user such that the images of virtual content are perceived by the first user in the augmented reality environment as if it were present in a real world; and one or more physical computer processors configured by computer-readable instructions to:
generate an augmented rendering of the first user to be presented in the augmented reality environment by:
receiving a user selection of a predefined three-dimensional representation;
causing the predefined three-dimensional representation to be downloaded responsive to the user selection;

obtain user input from the first user indicating a request to modify the downloaded predefined three-dimensional representation, wherein the request to modify the downloaded predefined three-dimensional representation comprises a request to modify one or more parameters of the downloaded predefined three-dimensional representation of the first user, wherein the one or more parameters define the downloaded predefined three-dimensional representation of the first user;

facilitate access to first information defining the augmented rendering of the first user by one or more other users, wherein facilitating access includes generating an image of the augmented rendering of the first user to be presented in one or more augmented reality environments via one or more other presentation devices of at least the one or more other users based on the first information, a field of view of the one or more other users, one or more positions of the one or more other presentation devices in the real world, and a position associated with the first user in the real world;

cause the first information defining the augmented rendering of the first user to be stored;

identify the one or more users visible within a field of view of the first user via the presentation device;

responsive to the identification of the one or more users within the field of view of the first user, obtain one or more other information defining individual augmented renderings of the one or more other users and one or more positions of the one or more other users in the real world;

generate individual images of the individual augmented renderings of the one or more other users to be presented in the augmented reality environment, wherein the images of the individual augmented renderings of the one or more other users are generated based on the one or more other information, the field of view of the first user, and a position of the presentation device in the real world; and cause the individual images of the individual augmented renderings of the one or more other users to be presented in the augmented reality environment via the presentation device.

7. The system of claim 6, wherein the one or more other information defines multiple augmented renderings of the one or more other users, wherein the one or more physical computer processors are further configured to:

cause an indication that the one or more other users have been identified within the field of view of the first user;
receive one or more indications of one or more selections by the one or more other users of one of the multiple augmented renderings of the one or more other users, wherein the selected ones of the multiple augmented renderings of the one or more other users comprise the augmented rendering of the one or more other users; and
obtain the one or more other information based on the one or more other selections by the one or more other users.

8. The system of claim 6, wherein the one or more physical computer processors are further configured to:
cause at least a portion of the first information defining the augmented rendering of the first user and instructions to be transmitted to a 3-D printer, wherein transmitting at least the portion of the first information and the instructions to the 3-D printer causes the 3-D printer to generate a physical representation of the augmented rendering of the first user.

9. A system configured to generate and facilitate access to a personalized augmented rendering of a user visible in an augmented reality environment, the system comprising:
a presentation device configured to convey images of virtual content to a first user such that the images of virtual content are perceived by the first user in the augmented reality environment as if it were present in a real world; and
one or more physical computer processors configured by computer-readable instructions to:
generate an augmented rendering of the first user to be presented in the augmented reality environment;
facilitate access to first information defining the augmented rendering of the first user by one or more other users;
identify one or more other users visible within a field of view of the first user via the presentation device;
responsive to the identification of the one or more other users within the field of view of the first user, obtain one or more other information defining individual augmented renderings of the one or more other users and one or more positions of individual ones of the one or more other users in the real world;
generate individual images of the individual augmented renderings of the one or more other users to be presented in the augmented reality environment, wherein the images of the individual augmented renderings of the one or more other users are generated based on the one or more other information, the field of view of the first user, and a position of the presentation device in the real world;
cause the individual images of the individual augmented rendering of the one or more users to be presented in the augmented reality environment via the presentation device;
receive a request to access the first information defining the augmented rendering of the first user from a third-party application related to an interactive game;
obtain user input from the first user indicating a desire to permit access to the first information by the third-party application; and
facilitate access to the first information by the third-party application, wherein facilitating access to the first information by the third-party application permits the third-party application to utilize the augmented rendering of the first user in the interactive game.

10. The system of claim 9, wherein the one or more physical computer processors are further configured to:
access subscription information for the first user, wherein the subscription information for the first user indicates one or more subscriptions of the first user; and
determine that at least one of the one or more subscriptions of the first user permits access to the one or more other information, wherein the one or more other information is obtained responsive to the determination that at least one of the one or more subscriptions of the first user permits access to the augmented renderings of the one or more other users.

11. The system of claim 9, wherein the field of view of the first user is defined based on location information and orientation information, the location information indicating at least a current location associated with the presentation device, and the orientation information indicating at least a pitch angle, a roll angle, and a yaw angle associated with the presentation device.

12. A method of generating and facilitating access to a personalized augmented rendering of a user visible in an augmented reality environment, the method comprising:
generating an augmented rendering of a first user to be presented in the augmented reality environment by:
obtaining one or more images of the first user; and
generating a three-dimensional representation of the first user based on the one or more images of the first user;
obtaining user input from the first user indicating a request to modify the three-dimensional representation of the first user, wherein the request to modify the three-dimensional representation of the first user comprises a request to modify one or more parameters of the three-dimensional representation of the first user, wherein the one or more parameters define the three-dimensional representation of the first user;
facilitating access to first information defining the augmented rendering of the first user by one or more other users, wherein facilitating access includes generating an image of the augmented rendering of the first user to be presented in one or more augmented reality environments via one or more other presentation devices of at least the one or more other users based on the first information, a field of view of the one or more other users, a position of the one or more other presentation devices in a real world, and a position associated with the first user in the real world;
identifying the one or more other users visible within a field of view of the first user via a presentation device;
responsive to the identification of the one or more other users within the field of view of the first user, obtaining one or more other information defining individual augmented renderings of the one or more other users and a position of the one or more other users in the real world;
generating individual images of the individual augmented renderings of the one or more other users to be presented in the augmented reality environment, wherein the images of the individual augmented renderings of the one or more other users are generated based on the one or more other information, the field of view of the first user, and a position of the presentation device in the real world; and causing the individual images of the individual augmented renderings of the one or more other users to be presented in the augmented reality environment via the presentation device, wherein the presentation device is configured to convey images of virtual content to the first user such that the images of virtual content are perceived by the first user in the augmented reality environment as if it were present in the real world.

13. The method of claim 12, the method further comprising:
obtaining one or more subscription information for the one or more other users, wherein the one or more subscription information for the one or more other users indicate one or more subscriptions of the one or more other users; and
determining that at least one of the one or more subscriptions of the one or more other users permits access to the augmented rendering of the first user, wherein the facilitation of access to the first information by the one or more other users is responsive to the determination that at least one of the one or more subscriptions of the one or more other users permits access to the augmented rendering of the first user.

14. The method of claim 13, wherein facilitating access to the first information comprises:
causing the first information to be transmitted to the one or more other presentation devices of the one or more other users.

15. The method of claim 12, wherein the one or more information defines multiple augmented renderings of the one or more users, the method further comprising:
causing an indication that the one or more users have been identified within the field of view of the first user;
receiving one or more indications of one or more selections by the one or more users of one of the multiple augmented renderings of the one or more users, wherein the selected ones of the multiple augmented renderings of the one or more users comprise the augmented rendering of the one or more users; and
obtaining the one or more information based on the selection by the one or more users.

\* \* \* \* \*